US012792094B2

(12) United States Patent
Kang et al.

(10) Patent No.: US 12,792,094 B2
(45) Date of Patent: Nov. 10, 2026

(54) ELASTIC MEMBER AND DISPLAY DEVICE INCLUDING SAME

(71) Applicant: LG INNOTEK CO., LTD., Seoul (KR)

(72) Inventors: Sung Won Kang, Seoul (KR); Sang Jun Ko, Seoul (KR); Jung Min Gwak, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 312 days.

(21) Appl. No.: 18/687,424

(22) PCT Filed: Aug. 30, 2022

(86) PCT No.: PCT/KR2022/012925
§ 371 (c)(1),
(2) Date: Feb. 28, 2024

(87) PCT Pub. No.: WO2023/033499
PCT Pub. Date: Mar. 9, 2023

(65) Prior Publication Data

US 2024/0370056 A1 Nov. 7, 2024

(30) Foreign Application Priority Data

Sep. 30, 2021 (KR) ........................ 10-2021-0117970

(51) Int. Cl.
*G06F 1/16* (2006.01)
*G06F 3/041* (2006.01)

(52) U.S. Cl.
CPC .......... *G06F 1/1641* (2013.01); *G06F 1/1616* (2013.01); *G06F 1/1652* (2013.01); (Continued)

(58) Field of Classification Search
CPC .... G06F 1/1641; G06F 1/1652; G06F 1/1681; G06F 2203/04102; H04M 1/0268
See application file for complete search history.

(56) References Cited

U.S. PATENT DOCUMENTS 10,490,771 B2 11/2019 Kim et al.
11,243,564 B2 2/2022 Kim et al.
(Continued)

FOREIGN PATENT DOCUMENTS

KR 10-2019-0080740 7/2019
KR 10-2020-0064376 6/2020
(Continued)

OTHER PUBLICATIONS

International Search Report dated Dec. 6, 2022 issued in Application No. PCT/KR2022/012925.

*Primary Examiner* — Anthony Q Edwards
(74) *Attorney, Agent, or Firm* — KED & ASSOCIATES, LLP

(57) ABSTRACT

An elastic member according to an embodiment includes: a first region and a second region, wherein a first direction defined as a width direction and a second direction defined as a longitudinal direction in the elastic member, the first region is defined as a folding region that is folded with the first direction as a folding axis, and the second region is defined as an unfolding region, a first pattern portion including a plurality of patterns is disposed in the first region, a length in the first direction is greater than a width in the second direction in the plurality of patterns, the first region includes a first column, a second column, and a third column that extend in the first direction and are sequentially disposed in the second direction around the folding axis, the first region includes a plurality of pattern regions respectively disposed in a plurality of columns of the first region, and a size of a pattern of the first column is greater than a size of a pattern of the second column.

18 Claims, 16 Drawing Sheets

(52) U.S. Cl.
CPC ............ *G06F 1/1681* (2013.01); *G06F 3/041* (2013.01); *G06F 2203/04102* (2013.01)

(56) References Cited

U.S. PATENT DOCUMENTS

| | | | | |
|---|---|---|---|---|
| 11,703,632 | B2 * | 7/2023 | Wen | G02B 6/0081 361/679.02 |
| 11,841,746 | B2 | 12/2023 | Kang et al. | |
| 12,510,937 | B2 * | 12/2025 | Yan | G06F 1/1681 |
| 2021/0068281 | A1 | 3/2021 | Song | |
| 2021/0165454 | A1 * | 6/2021 | Dong | G06F 1/1652 |
| 2021/0263563 | A1 * | 8/2021 | Tsuchihashi | G06F 1/1652 |
| 2021/0352814 | A1 * | 11/2021 | Park | B32B 3/266 |
| 2023/0018777 | A1 * | 1/2023 | Park | G06F 1/1656 |
| 2023/0111654 | A1 * | 4/2023 | Li | G09F 9/301 361/807 |
| 2023/0154360 | A1 * | 5/2023 | Zhao | B32B 3/266 |
| 2023/0354533 | A1 * | 11/2023 | Fu | H04M 1/0268 |
| 2024/0155788 | A1 * | 5/2024 | Huang | G06F 1/1641 |
| 2024/0241398 | A1 * | 7/2024 | Large | H10K 77/111 |

FOREIGN PATENT DOCUMENTS

| | | |
|---|---|---|
| KR | 10-2021-0028772 | 3/2021 |
| KR | 10-2021-0085131 | 7/2021 |
| WO | WO 2020/184988 | 9/2020 |
| WO | WO 2021/137480 | 7/2021 |

* cited by examiner

【FIG. 1】
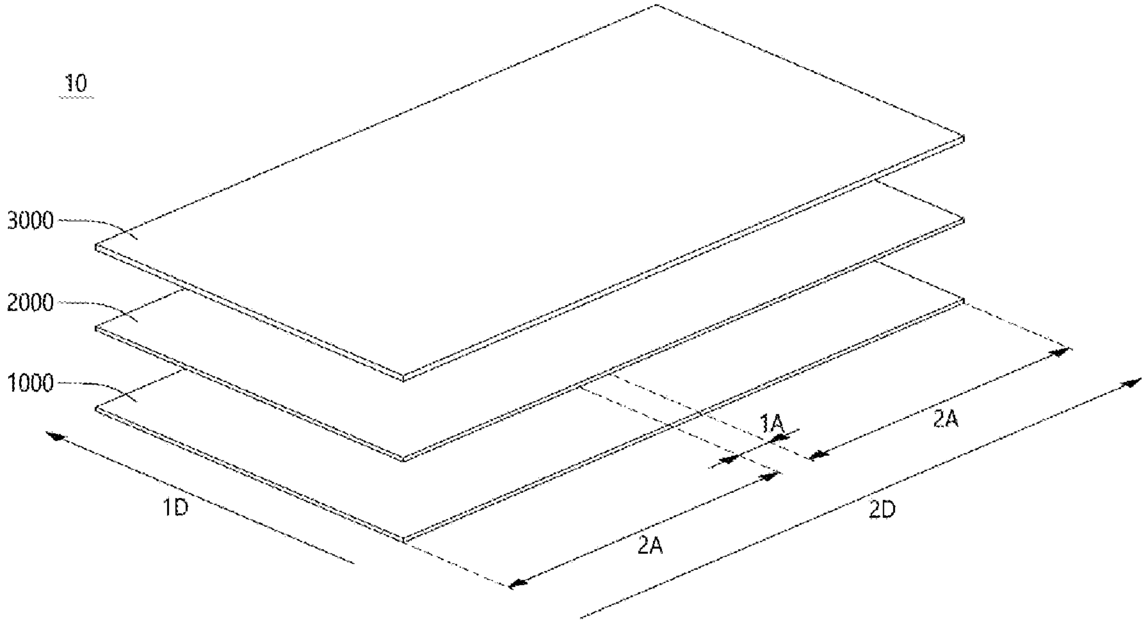
【FIG. 2】
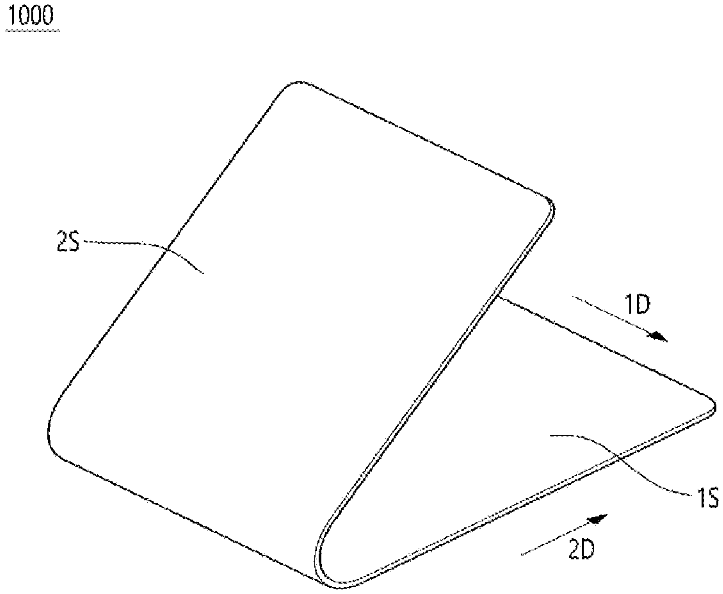

【FIG. 3】
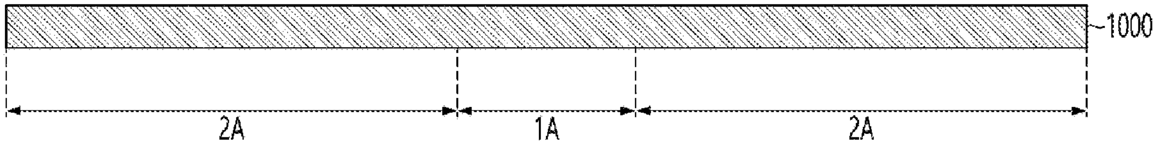
【FIG. 4】
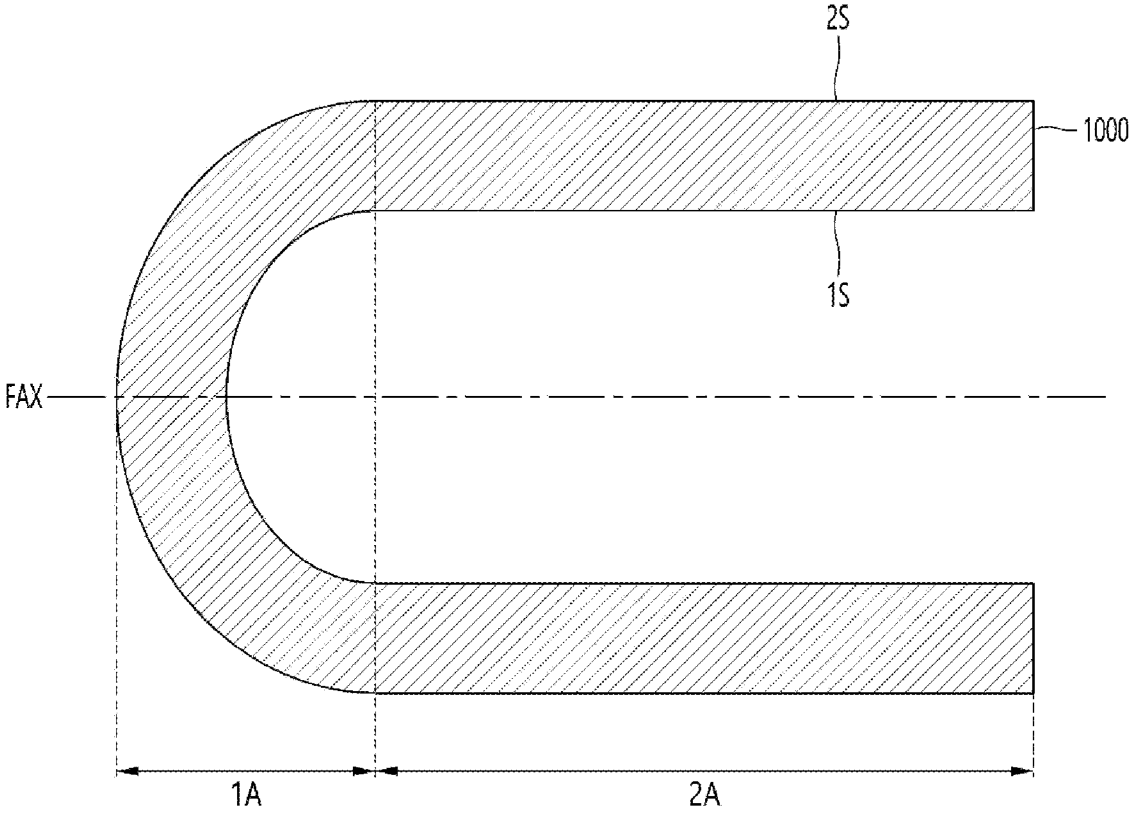

【FIG. 5】
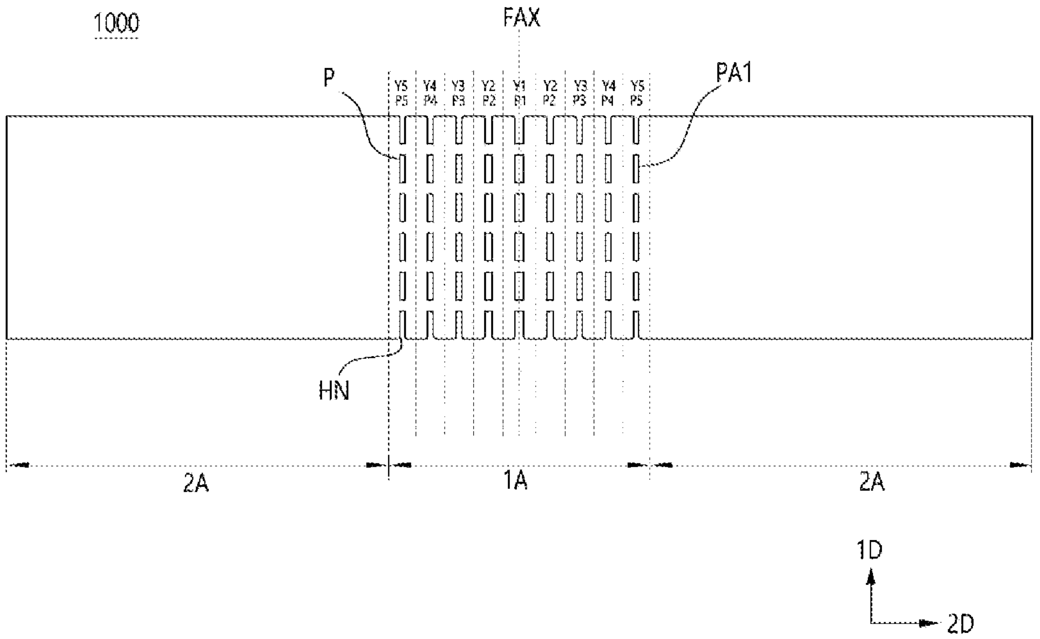
【FIG. 6】
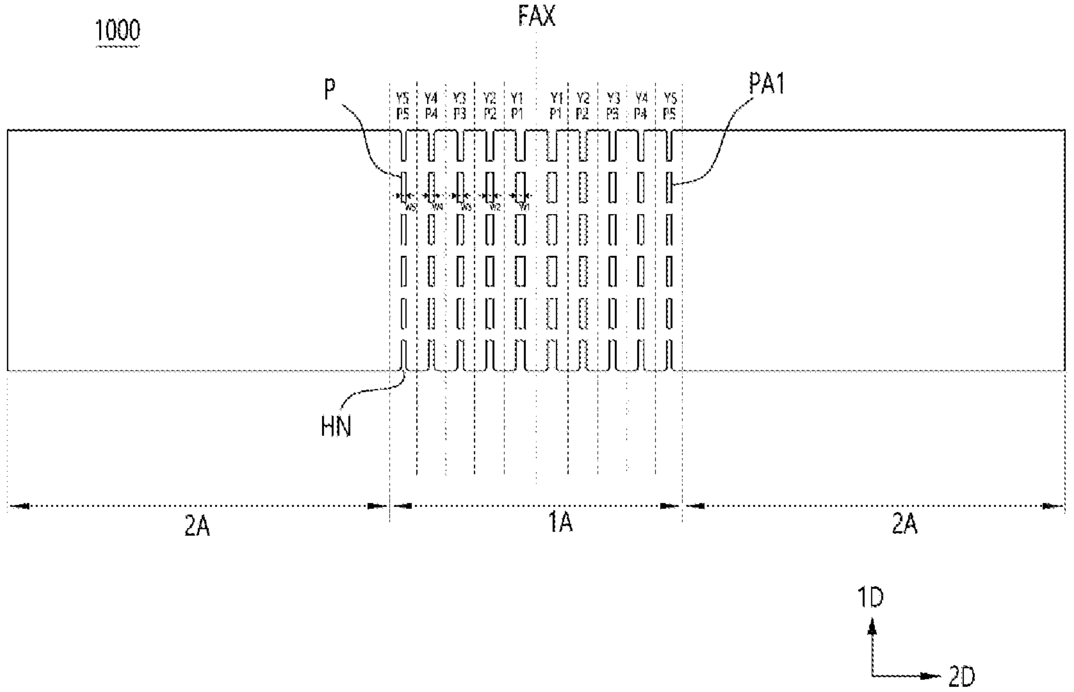

【FIG. 7】
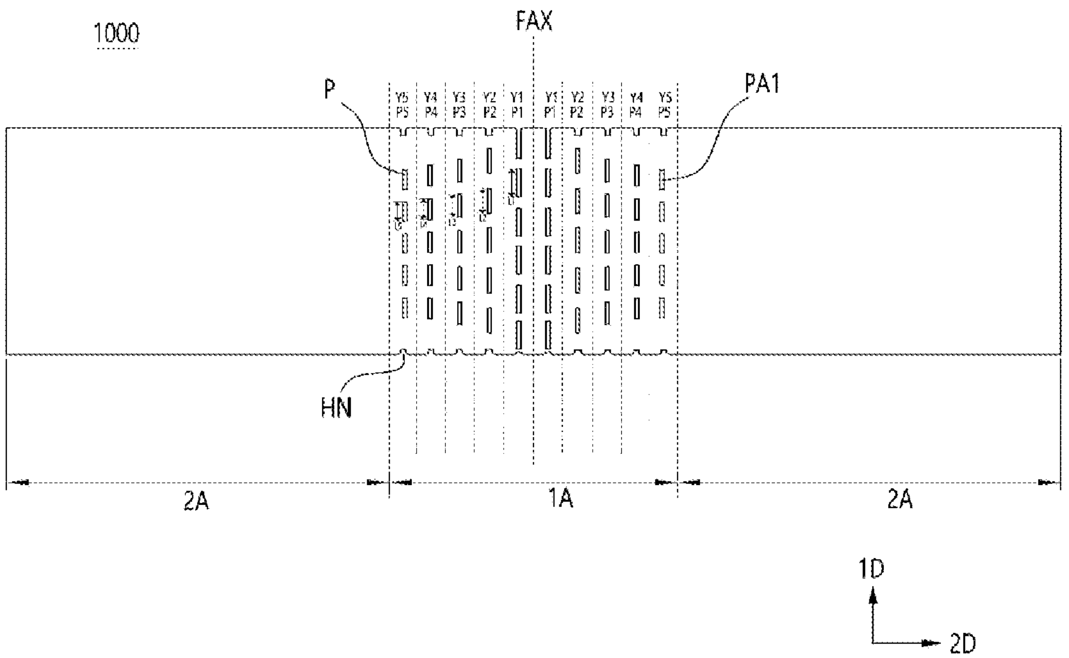
【FIG. 8】
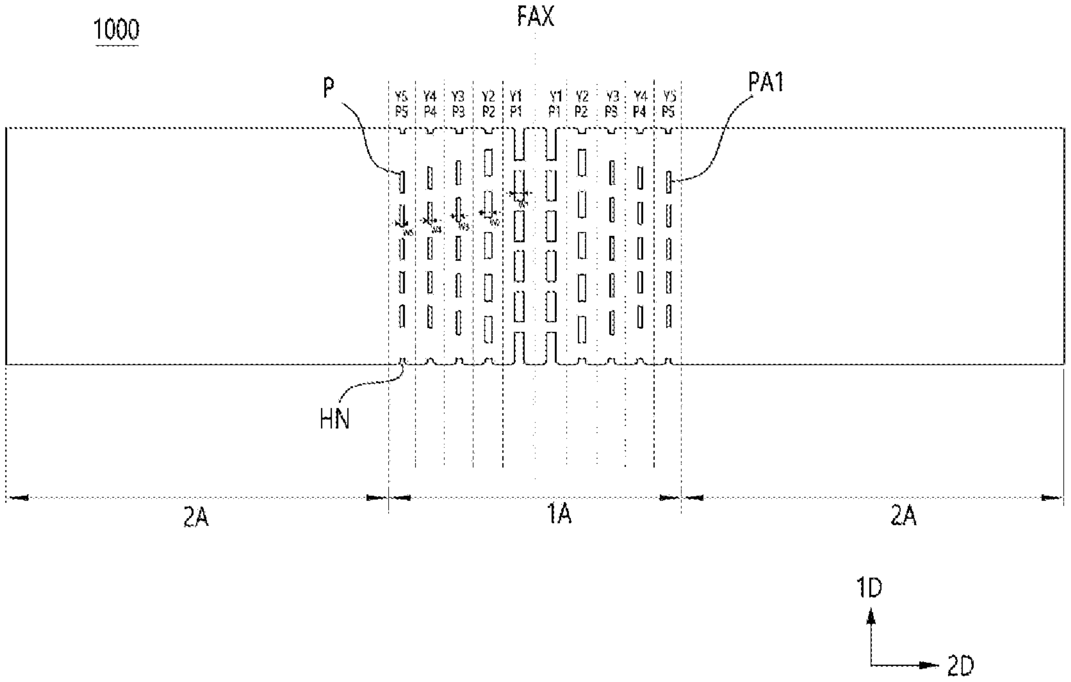

【FIG. 9】
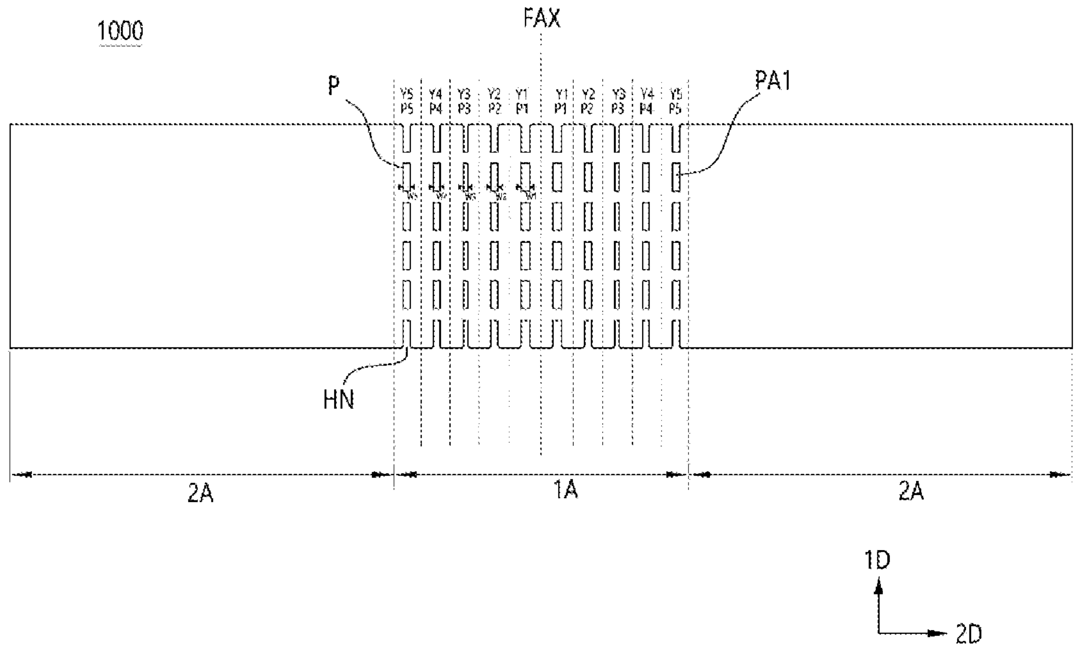
【FIG. 10】
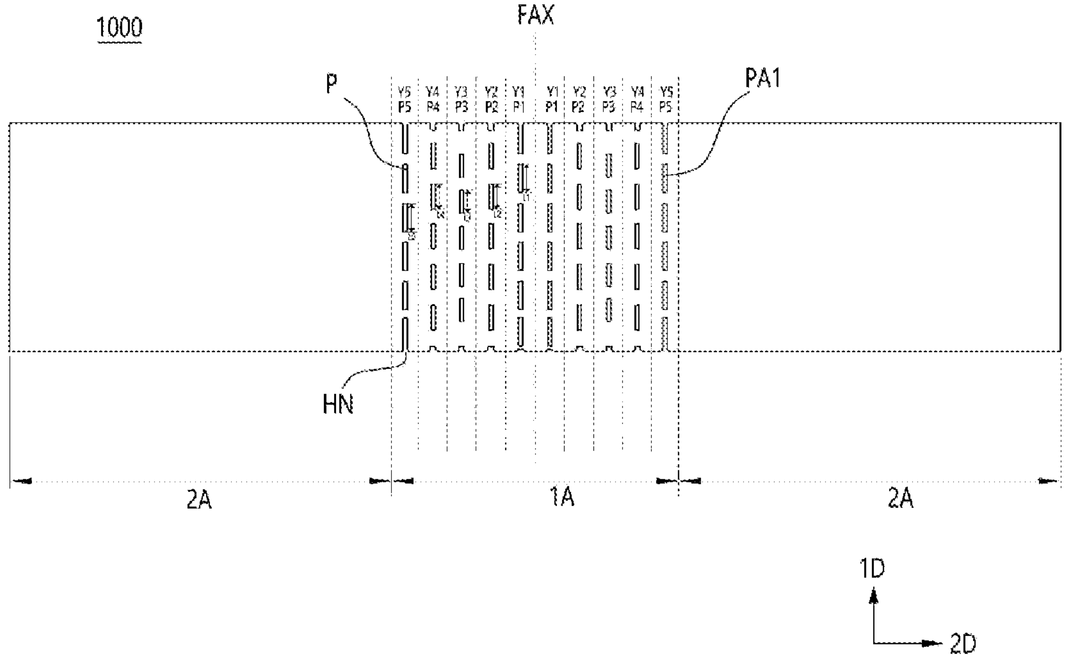

【FIG. 11】
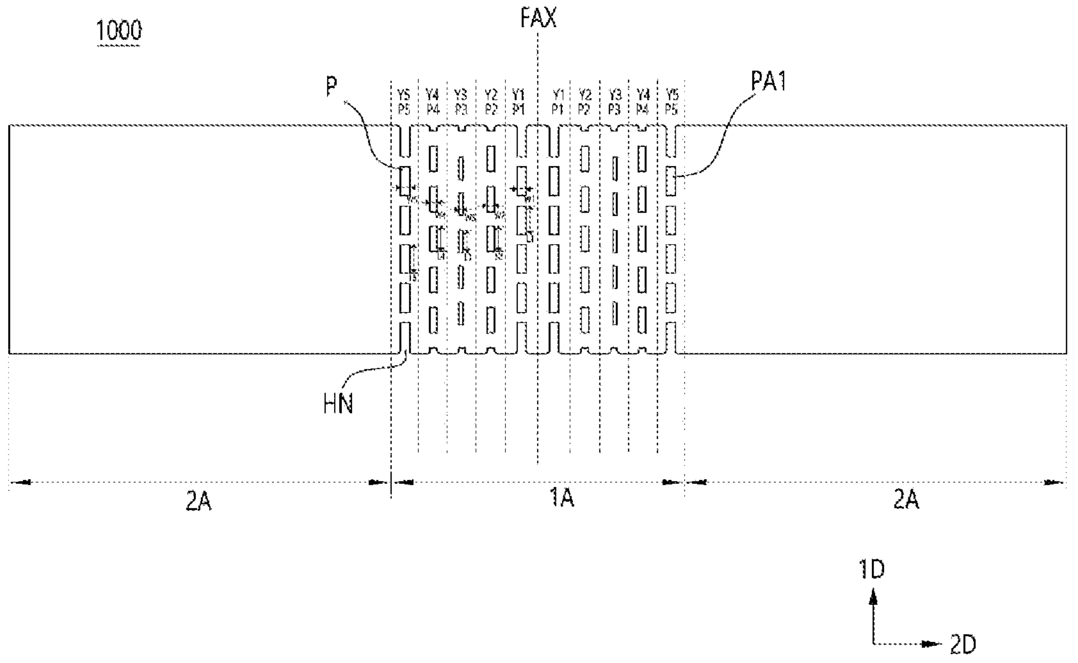
【FIG. 12】
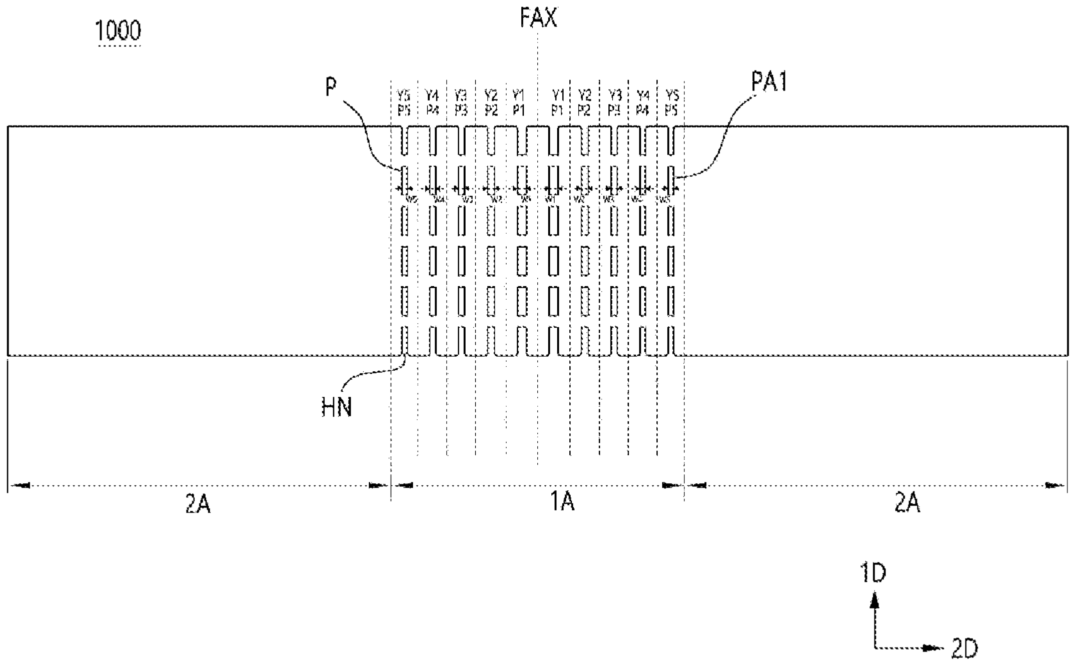

【FIG. 13】
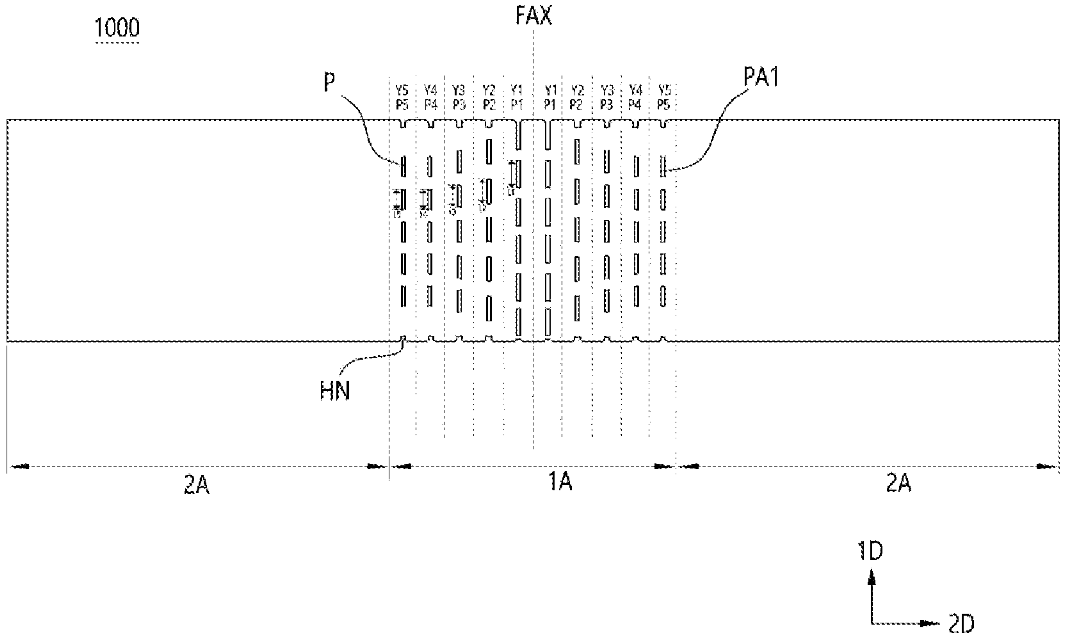
【FIG. 14】
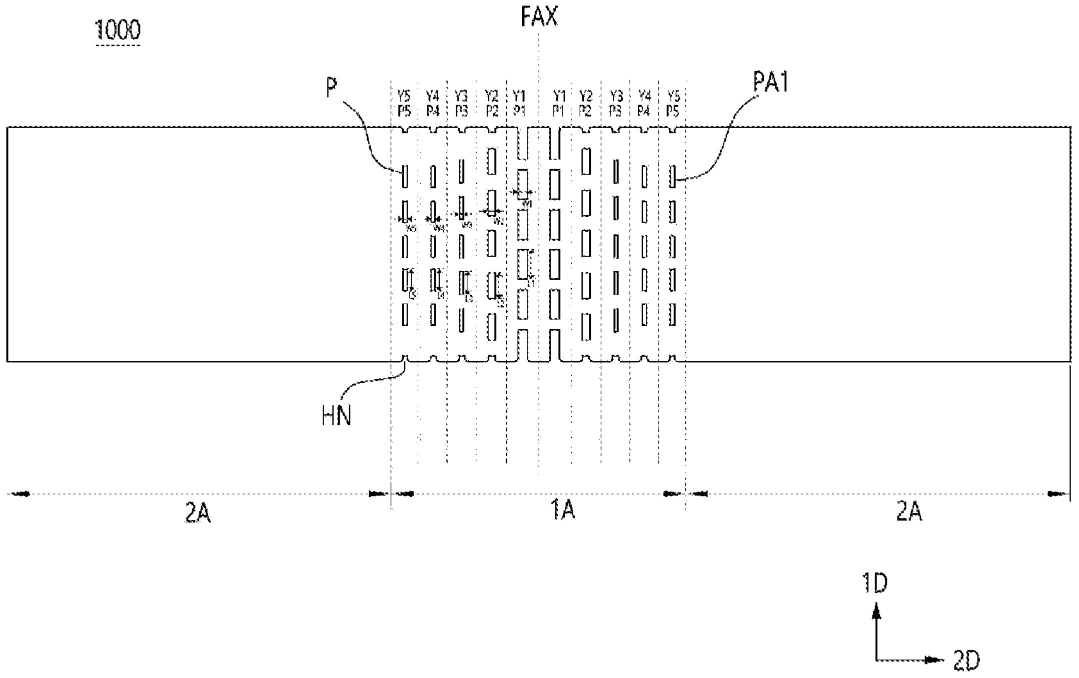

【FIG. 15】
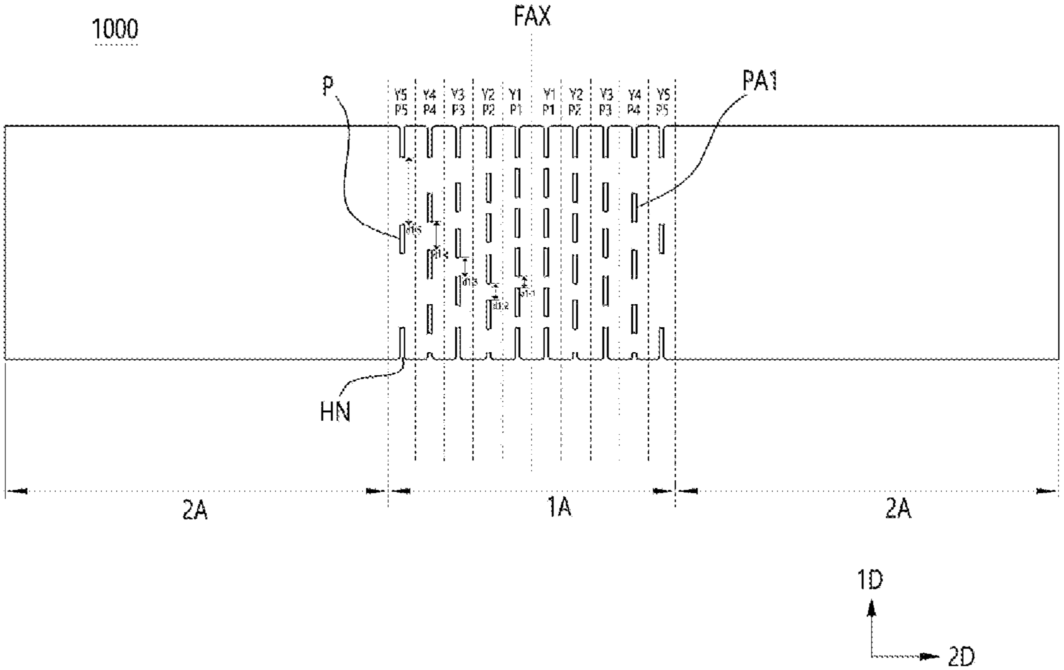
【FIG. 16】
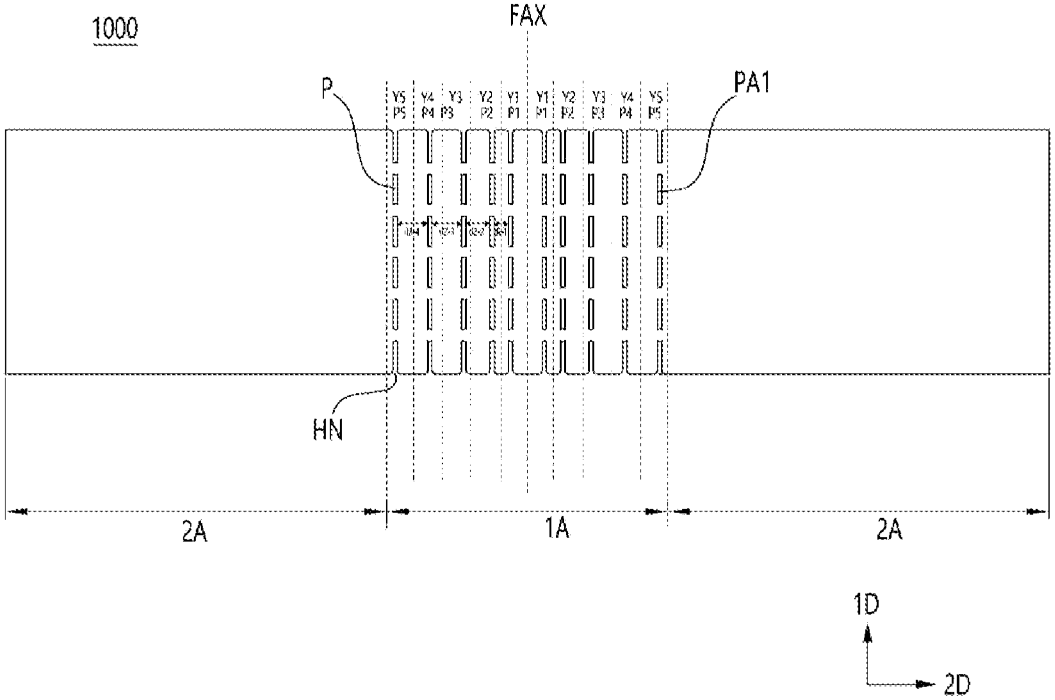

【FIG. 17】
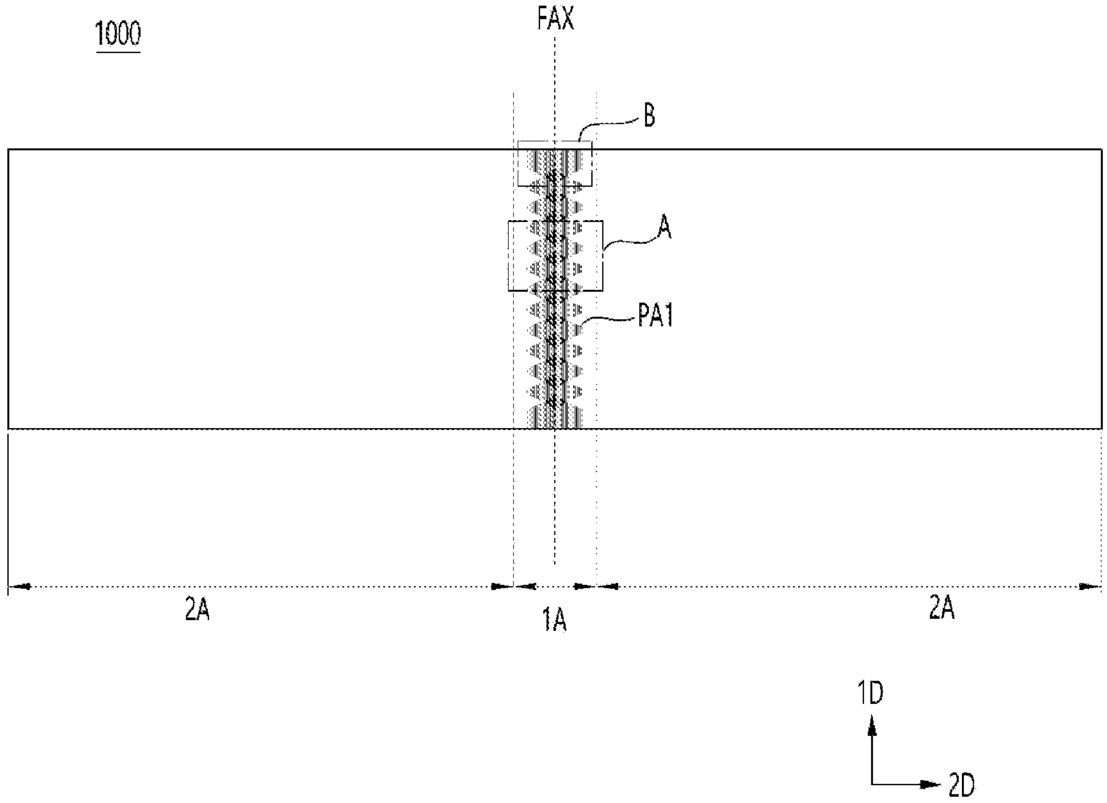

【FIG. 18】
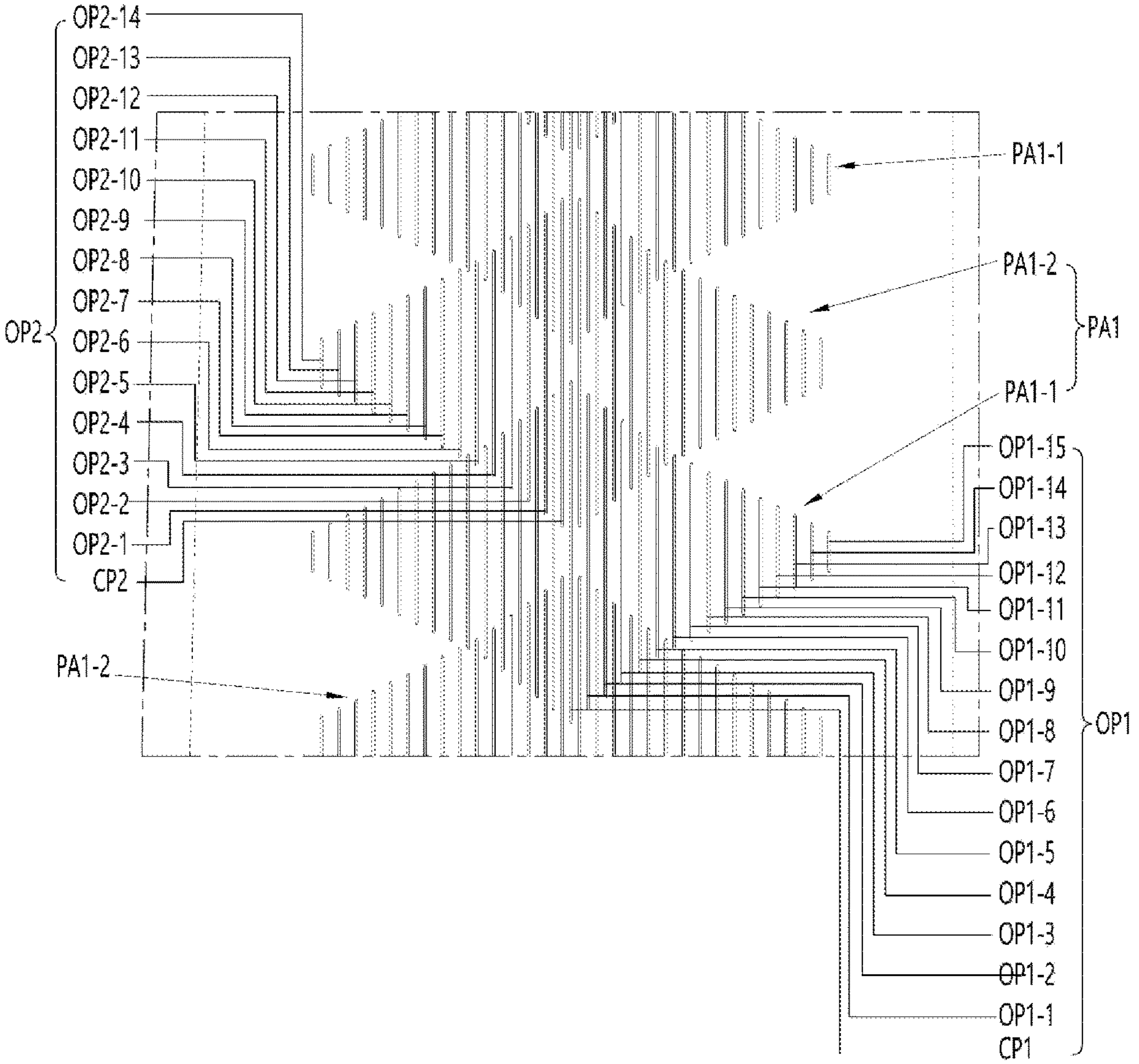

【FIG. 19】
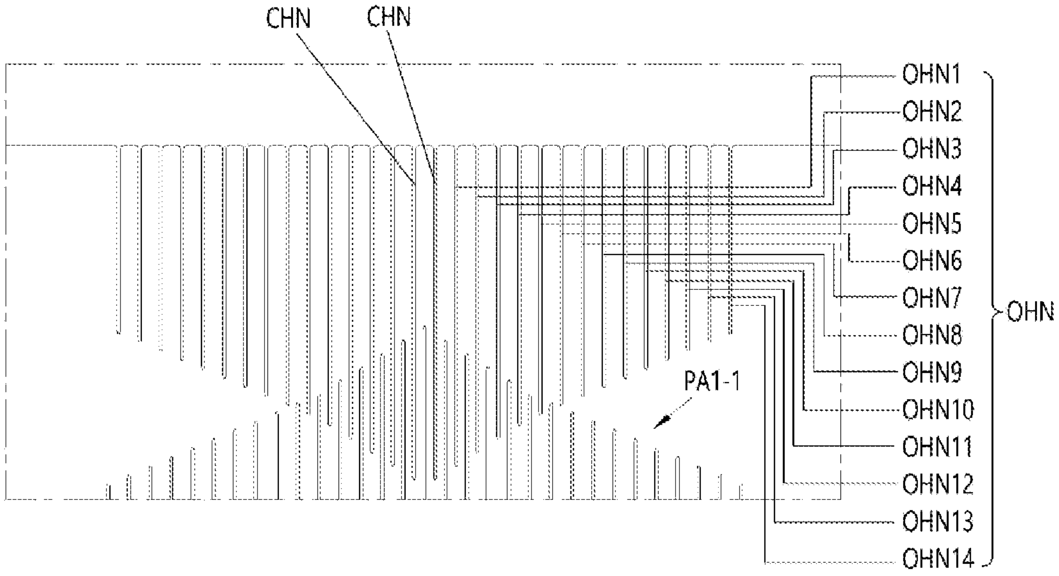
【FIG. 20】
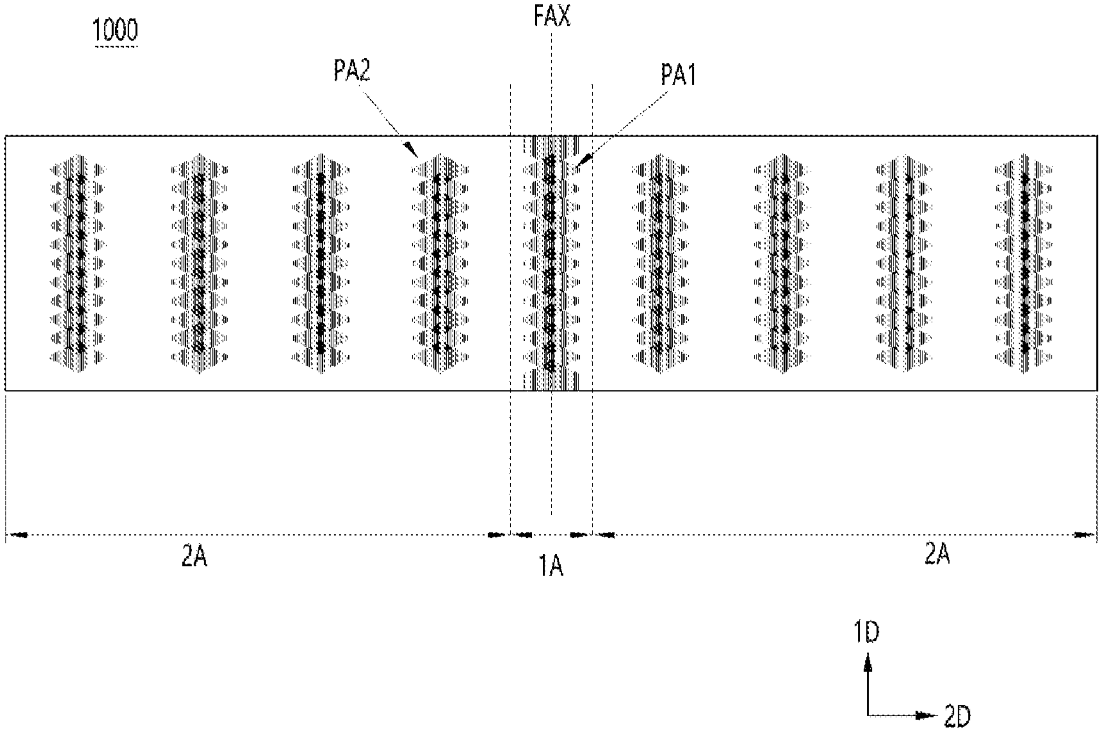

【FIG. 21】
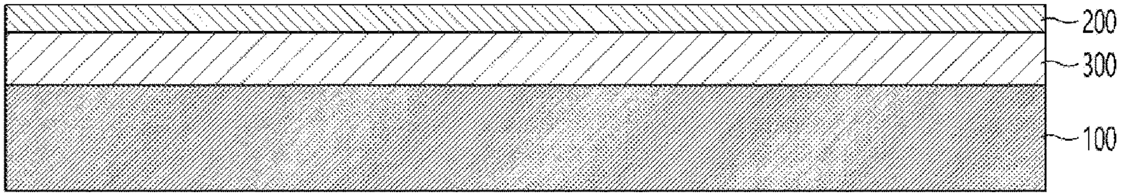
【FIG. 22】
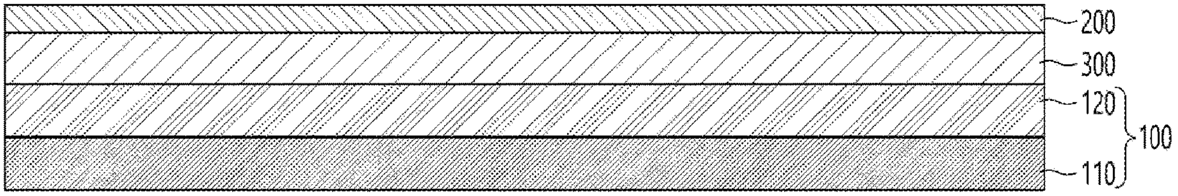
【FIG. 23】
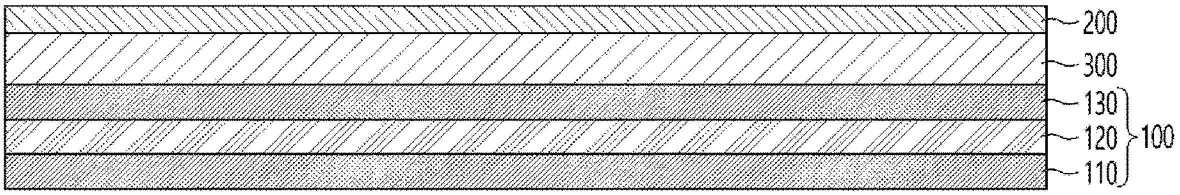

【FIG. 24】
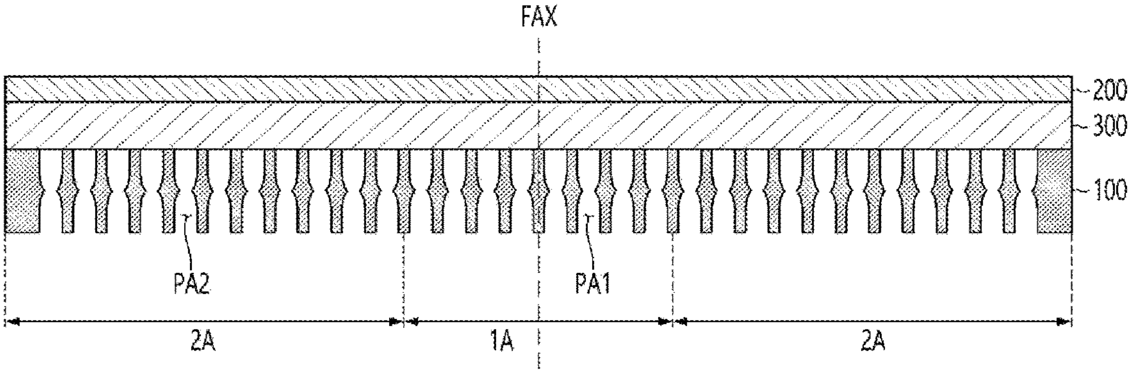
【FIG. 25】
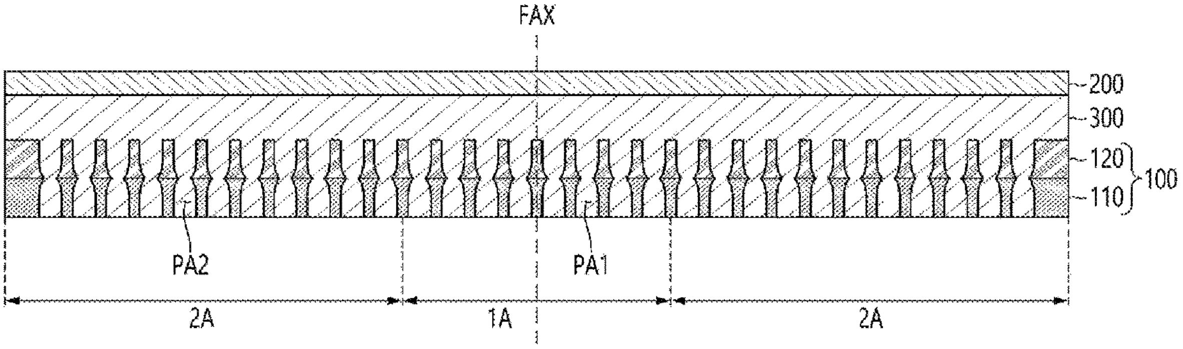

【FIG. 26】
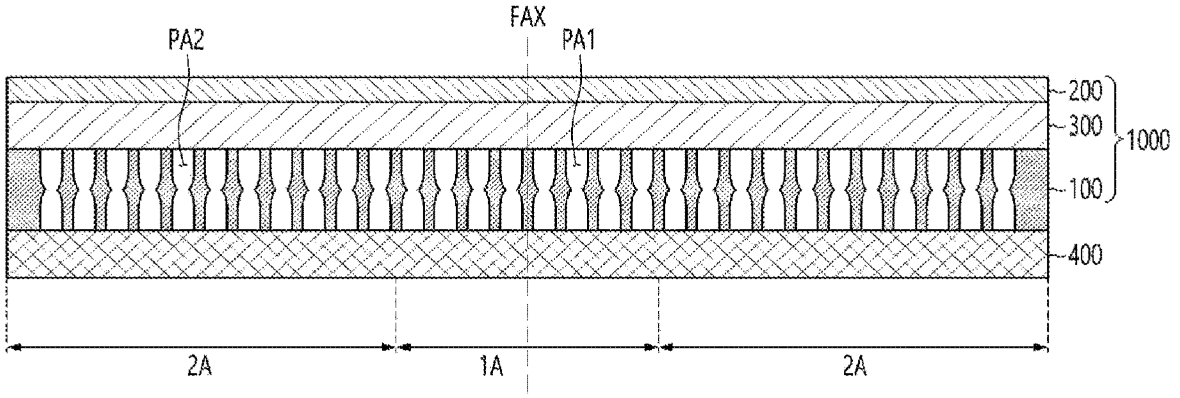
【FIG. 27】
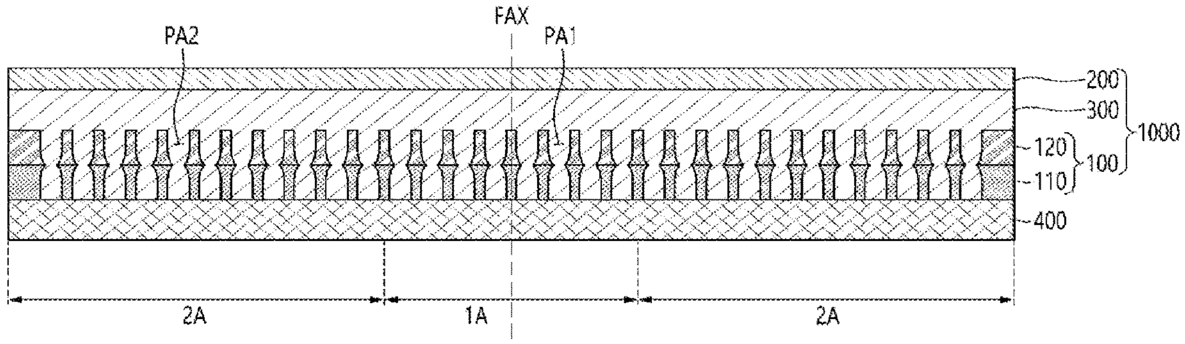

【FIG. 28】
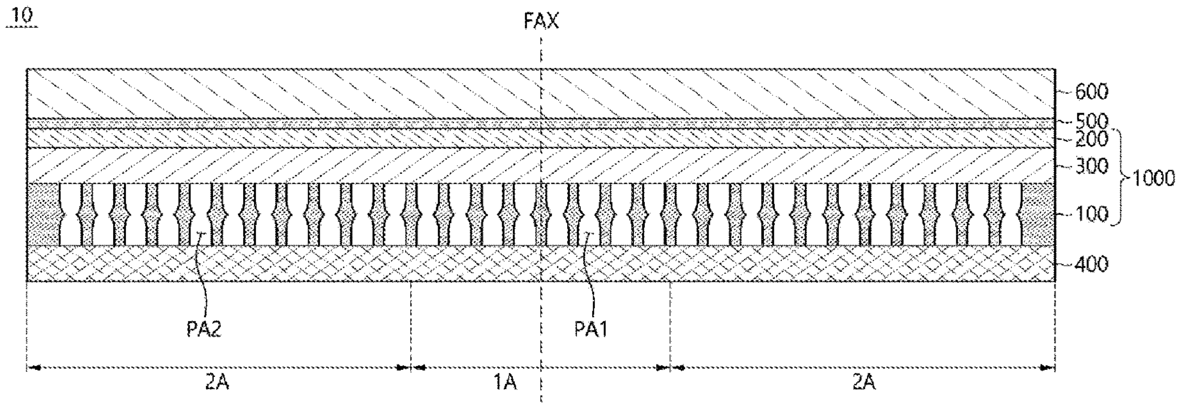
【FIG. 29】
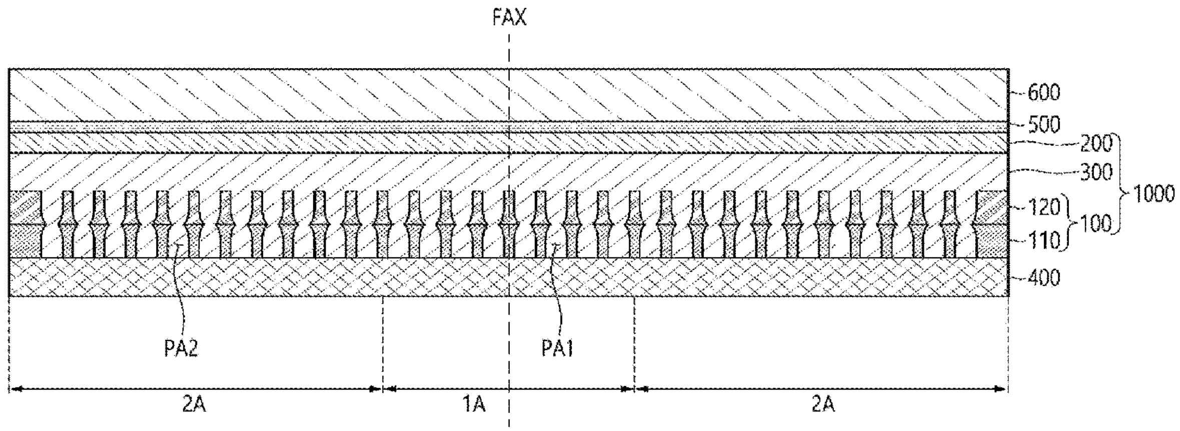

【FIG. 30】
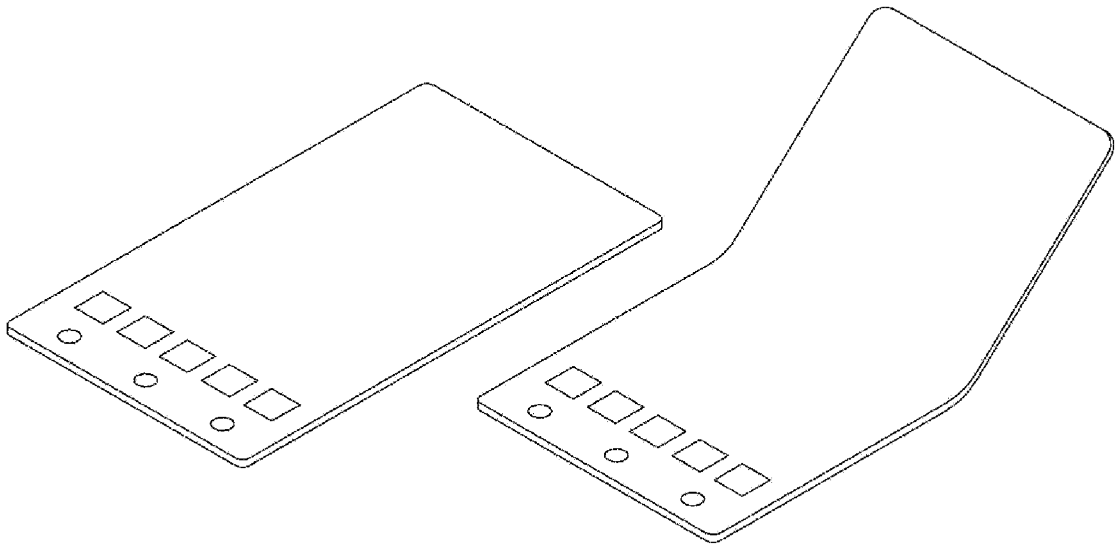

ELASTIC MEMBER AND DISPLAY DEVICE INCLUDING SAME

CROSS-REFERENCE TO RELATED PATENT APPLICATIONS

This application is a U.S. National Stage Application under 35 U.S.C. § 371 of PCT Application No. PCT/KR2022/012925, filed Aug. 30, 2022, which claims priority to Korean Patent Application No. 10-2021-0117970, filed Sep. 3, 2021, whose entire disclosures are hereby incorporated by reference.

TECHNICAL FIELD

Embodiments relate to an elastic member and a display device including the same.

BACKGROUND

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display region may be increased, and a user may easily carry the display.

After the flexible or foldable display device is folded or bent, a restoration process of unfolding the flexible display device again may be repeated.

That is, since the flexible or foldable display device repeats folding and unfolding operations, a substrate of the flexible display device is repeatedly used, so that flatness may be deteriorated.

In detail, in the flexible or foldable display device, since a folding region is a region where stress is concentrated during repeated folding and unfolding, the flatness may be deteriorated compared with unfolding region.

Accordingly, there is a problem that cracks occur in the folding region or wrinkles visually recognized from the outside occur, and thus the lifespan of the flexible or foldable display device is reduced and the reliability is deteriorated.

In addition, the folding region may have different curvatures and radii of curvature for each position of the folding region, and accordingly, magnitudes of compressive stress and tensile stress generated for each position of the folding region may be different.

Accordingly, when the flexible or foldable display device is folded, there is a problem that the surface flatness of the folding region is deteriorated due to a difference in the magnitude of stress that is generated differently for each position of the folding region in the folding region.

Therefore, there is a need for an elastic member having a new structure capable of solving the above problems.

SUMMARY

Technical Problem

An embodiment is directed to providing an elastic member capable of improved folding reliability and low flatness even in repeated folding and restoration processes, and a display device including the same.

Technical Solution

An elastic member according to an embodiment includes: a first region and a second region, wherein a first direction defined as a width direction and a second direction defined as a longitudinal direction in the elastic member, the first region is defined as a folding region that is folded with the first direction as a folding axis, and the second region is defined as an unfolding region, a first pattern portion including a plurality of patterns is disposed in the first region, a length in the first direction is greater than a width in the second direction in the plurality of patterns, the first region includes a first column, a second column, and a third column that extend in the first direction and are sequentially disposed in the second direction around the folding axis, the first region includes a plurality of pattern regions respectively disposed in a plurality of columns of the first region, and a size of a pattern of the first column is greater than a size of a pattern of the second column.

Advantageous Effects

In the elastic member according to an embodiment, a length, width, opening area, and size of a spacing of a pattern disposed in a column of a folding region may be changed.

In detail, the length, width, opening area, and spacing of the pattern disposed in the column of the folding region may be changed while extending in a first direction and/or a second direction.

Accordingly, it is possible to properly secure folding characteristics and flatness in each position according to a magnitude of stress acting differently depending on a position by varying the length, width, opening area, and spacing of the pattern according to the magnitude of the stress generated in each region according to a shape of the folding region of the elastic member.

Therefore, it is possible to improve folding reliability by controlling the length, width, opening area, and spacing of the pattern for relieving the compressive stress and tensile stress generated due to folding and restoring in the folding region, and a magnitude of flatness in the first region may be decreased by securing sufficient elastic force, and thus it is possible to improve the uniformity of flatness.

BRIEF DESCRIPTION OF THE DRAWINGS

FIG. 1 is a perspective view of a display device according to an embodiment.

FIG. 2 is a perspective view of an elastic member according to an embodiment.

FIG. 3 is a side view of the elastic member according to the embodiment before folding.

FIG. 4 is a side view of the elastic member according to the embodiment after folding.

FIGS. 5 to 8 are a top view of an elastic member according to a first embodiment.

FIGS. 9 to 11 are another top view of the elastic member according to the first embodiment.

FIGS. 12 to 14 are still another top view of the elastic member according to the first embodiment.

FIGS. 15 and 16 are a top view of an elastic member according to a second embodiment.

FIG. 17 is a top view of an elastic member according to a third embodiment.

FIG. 18 is an enlarged view of region A in FIG. 17.

FIG. 19 is an enlarged view of region B in FIG. 17.

FIG. 20 is a top view of an elastic member according to a fourth embodiment.

FIGS. 21 to 23 are cross-sectional views for describing a layer structure of the elastic member according to the embodiment.

FIGS. 24 and 25 are cross-sectional views for describing an arrangement structure of the elastic member according to the embodiment.

FIGS. 26 and 27 are cross-sectional views of a flexible support including the elastic member according to the embodiment.

FIGS. 28 and 29 are cross-sectional views of a display device including the flexible support according to the embodiment.

FIG. 30 is a view for describing an example in which the display device according to the embodiment is applied.

DETAILED DESCRIPTION OF THE EMBODIMENTS

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and replaced. In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected" or "coupled" to another element, it may include not only when the element is directly "connected" or "coupled" to other elements, but also when the element is "connected" or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment and a folding support and a display device including the same will be described with reference to the drawings.

FIG. 1 is a perspective view of a display device according to an embodiment, and FIGS. 2 to 4 are perspective views and cross-sectional views of an elastic member of the display device according to the embodiment.

Referring to FIG. 1, a display device 10 according to the embodiment may include an elastic member 1000 and a panel including a display panel 2000 and a touch panel 3000 disposed on the elastic member 1000.

The elastic member 1000 may support the display panel 2000 and the touch panel 3000. That is, the elastic member 1000 may be a support substrate supporting the display panel 2000 and the touch panel 3000.

Meanwhile, the touch panel 3000 may be integrally formed with the display panel 2000. For example, the touch panel 3000 may be integrally formed with the display panel 2000 in an on-cell or in-cell method.

The elastic member 1000 may include a metallic material and a non-metallic material. In detail, the elastic member 1000 may be formed of a single layer or a plurality of layers, and the single layer or the plurality of layers may include at least one of the metallic material and the non-metallic material. For example, the elastic member 1000 may include metal, metal alloy, plastic, a composite material (e.g., carbon fiber reinforced plastic, a magnetic or conductive material, a glass fiber reinforced material, etc.), ceramic, sapphire, glass, and the like.

The elastic member 1000 may be flexible or foldable. That is, the elastic member 1000 may be folded or bent in one direction. That is, the elastic member 1000 may be a substrate for display applied to a flexible display device or a foldable display device.

In the elastic member 1000, a first direction 1D and a second direction 2D that is different from the first direction 1D may be defined. For example, the first direction 1D may be defined as the same direction as a folding axis direction of the elastic member 1000. In addition, the second direction may be a direction perpendicular to the first direction.

One direction of the first direction 1D and the second direction 2D may be defined as a width direction of the elastic member 1000, and the other direction may be defined as a longitudinal direction of the elastic member 1000.

The elastic member 1000 may be folded with any one of the width direction and the longitudinal direction of the elastic member 1000 as a folding axis.

Hereinafter, for convenience of description, the first direction is defined as the same direction as the folding axis. In addition, the first direction is defined as the width direction of the elastic member 1000, and the second direction is defined as the longitudinal direction of the elastic member 1000.

The elastic member 1000 may include at least two regions. In detail, the elastic member 1000 may include a first region 1A and a second region 2A.

The first region 1A may be defined as a region where the elastic member 1000 is folded. That is, the first region 1A may be defined as a region where the elastic member 1000 and the display device 10 including the elastic member 1000 are folded. That is, the first region 1A may be a folding region.

In addition, the second region 2A may be defined as a region where the elastic member 1000 is not folded. That is, the second region 2A may be defined as a region where the elastic member 1000 and the display device 10 including the elastic member 1000 are not folded. That is, the second region 2A may be an unfolding region.

The first region 1A and the second region 2A will be described in detail below.

The display panel 2000 may be disposed on the elastic member 1000.

The display panel 2000 may include a plurality of pixels including a switching thin film transistor, a driving thin film transistor, a power storage device, and an organic light-emitting diode (OLED). In case of the organic light-emitting diode, deposition is possible at a relatively low temperature and may be mainly applied to the flexible display device for reasons of low power and high luminance. Here, the pixel refers to a minimum unit for displaying an image, and the display panel displays an image through the plurality of pixels.

The display panel may include a substrate, a gate line disposed on the substrate, a data line isolated from the gate line, and a common power line. In general, one pixel may be defined by the gate line, the data line, and the common power line as a boundary.

The substrate may include a material having flexible properties such as a plastic film, and the display panel 2000 may be implemented by disposing an organic light-emitting diode and a pixel circuit on a flexible film.

The touch panel 3000 may be disposed above the display panel 2000. The touch panel 3000 may implement a touch function in the foldable display device or the flexible display device, and the touch panel may be omitted in a foldable display device or a flexible display device that simply displays an image without the touch function.

The touch panel 3000 may include a substrate and a touch electrode disposed on the substrate. The touch electrode may sense a position of an input device touched by the foldable display device or the flexible display device by a capacitive type or a resistive type.

The substrate of the touch panel 3000 may include a material having flexible properties such as a plastic film, and the touch panel 3000 may be implemented by disposing the touch electrode on the flexible film.

As described above, when the touch panel 3000 is integrally formed with the display panel 2000, the substrate of the touch panel 3000 may be a substrate of the display panel or a part of the display panel. Through this, the touch panel 3000 and the display panel 2000 can be integrally formed, and a thickness of the display device may be reduced.

Meanwhile, the elastic member 1000 and the display panel 2000 may have different sizes.

For example, an area of the elastic member 1000 may be 90% or more to 110% or less of an area of the display panel 2000. In detail, the area of the elastic member 1000 may be 95% or more to 105% or less of the area of the display panel 2000. In more detail, the area of the elastic member 1000 may be 97% or more to 100% or less of the area of the display panel 2000.

When the area of the elastic member 1000 is 90% or less of the area of the display panel 2000, support force of the elastic member 1000 supporting the display panel 2000 or the touch panel 3000 is deteriorated, and thus a curl phenomenon or the like may occur in the unfolding region of the elastic member 1000. Accordingly, when a user visually recognizes a screen region, visibility may be deteriorated, and when a touch is driven, a screen of a touch region may be incomplete due to a curled region, and thus a touch malfunction may occur.

In addition, when the area of the elastic member 1000 increases to be 110% or more of the area of the display panel 2000, the support force for supporting the display panel or the touch panel may be secured by the elastic member 1000, but a bezel region of a display device including the substrate, the display panel, and the touch panel may increase. Accordingly, it is impossible to provide a wide effective screen region to the user, which may cause inconvenience in using the display device.

Meanwhile, although not shown in the drawings, a cover window protecting the foldable display device or the flexible display device may be additionally disposed above the touch panel 3000 or above the display panel 2000 (when the touch panel is omitted).

Meanwhile, the elastic member 1000, the display panel 2000, and the touch panel 3000 may be adhered to each other through an adhesive layer or the like.

As described above, the display device includes the elastic member 1000.

Referring to FIG. 2, the elastic member 1000 may be bent in one direction.

In detail, the elastic member 1000 may include a first surface 1S and a second surface 2S opposite to the first surface 1S. In the elastic member 1000, the first surface 1S or the second surface 2S may be bent to face each other. That is, the elastic member 1000 may be bent so that the surfaces on which the panels are disposed face each other. Alternatively, the elastic member 1000 may be bent so that a surface opposite to the surface on which the panels are disposed faces.

However, the embodiment is not limited thereto, and the second surface and the first surface of the elastic member 1000 may be bent to alternately face each other. That is, the elastic member 1000 may include a plurality of first regions and a plurality of second regions.

In the following description, as shown in FIG. 2, it will be mainly described that the elastic member 1000 is bent in a direction in which the first surfaces 1S face each other.

As described above, the elastic member 1000 may have the first region 1A and the second region 2A defined therein. The first region 1A and the second region 2A may be regions defined when the elastic member 1000 is bent in the direction in which the first surfaces 1S face each other.

In detail, the elastic member 1000 is bent in one direction, and the elastic member 1000 may be divided into the first region 1A that is folded (folding region) and the second region 2A that is not folded (unfolding region).

Referring to FIG. 3 and FIG. 4, the elastic member 1000 may include a first region 1A that is a region where the elastic member 1000 is bent. In addition, the elastic member 1000 may include a second region 2A that is not bent and is disposed adjacent to the first region 1A.

For example, the second region 2A may be formed on the left and right sides of the first region 1A, respectively, based on a bending direction of the elastic member 1000. That is, the second region 2A may be disposed at both ends of the first region 1A. That is, the first region 1A may be disposed between the second regions 2A.

However, the embodiment is not limited thereto, and the first region 1A may be further formed outside the second region 2A.

The first region 1A and the second region 2A may be formed on the same elastic member 1000. That is, the first region 1A and the second region 2A may be formed integrally with each other without being separated from the same one elastic member 1000.

Sizes of the first region 1A and the second region 2A may be different from each other. In detail, the size of the second region 2A may be greater than the size of the first region 1A.

In addition, an area of the first region 1A of the elastic member 1000 may be 1% or more to 30% or less of an entire area of the elastic member 1000. In detail, the area of the first region 1A of the elastic member 1000 may be 5% or more to 20% or less of the entire area of the elastic member 1000.

The area of the first region 1A of the elastic member 1000 may be 10% or more to 15% or less of the entire area of the elastic member 1000.

When the area of the first region 1A of the elastic member 1000 is less than 1% of the entire area of the elastic member 1000, cracks may occur at the interface of the folding and unfolding regions of the elastic member 1000 when the folding and restoring of the substrate is repeated, and thus folding reliability of the elastic member 10000 may be deteriorated.

In addition, when the area of the first region 1A of the elastic member 1000 exceeds 30% of the entire area of the elastic member 1000, curl may occur in the folding region of the display panel 2000 when the substrate is folded. Accordingly, when the user visually recognizes the screen region, the visibility may be deteriorated, and when the touch is driven, the screen of the touch region may be incomplete due to the curled region, and thus the touch malfunction may occur.

In the drawings, it is illustrated that the first region 1A is positioned in a central portion of the elastic member 1000, but the embodiment is not limited thereto. That is, the first region 1A may be positioned in one end and an end region of the elastic member 1000. That is, the first region 1A may be positioned at one end and the end region of the elastic member 1000 such that the size of the first region 1A is asymmetric.

FIG. 4 is a side view of the substrate for display after the substrate is folded.

Referring to FIG. 4, the elastic member 1000 may be folded in one direction based on the folding axis. In detail, the first surfaces may be folded in a direction facing each other.

As the elastic member 1000 is folded in one direction, the first region 1A and the second region 2A may be formed on the elastic member 1000. That is, a folding region formed as the elastic member 1000 is folded in one direction and an unfolding region positioned at both ends of the folding region may be formed on the elastic member 1000.

The folding region may be defined as a region where a curvature R is formed, and the unfolding region may be defined as a region where the curvature R is not formed or the curvature is close to zero.

Referring to FIGS. 3 and 4, the elastic member 1000 may be folded in one direction to be formed in an order of the unfolding region, the folding region, and the unfolding region.

A plurality of pattern portions may be formed in at least one of the first region 1A and the second region 2A in order to reduce and distribute stress generated when the elastic member 1000 is folded. The pattern portions will be described in detail below.

Meanwhile, FIG. 4 illustrates that the first surfaces 1S of the elastic member 1000 are folded to face each other, but the embodiment is not limited thereto, and the second surfaces 2S may be folded to face each other.

In addition, FIG. 4 illustrates that the curvature is decreased (a radius of the curvature is increased) while the elastic member 1000 extends from a center of the folding axis, but the embodiment is not limited thereto. For example, the curvature may decrease or increase while the elastic member 1000 extends from the center of the folding axis. That is, the curvature may decrease and then increase while the elastic member 1000 extends from the center of the folding axis. Alternatively, the elastic member 1000 may be formed in a shape in which the curvature decreases and then increases, or the curvature decreases and then increases, and then decreases again while extending from the center of the folding axis. That is, a folding shape of the elastic member 1000 may be formed in various folding shapes as well as a U-shaped shape.

As the elastic member 1000 according to the embodiment is repeatedly folded and restored, wrinkles may occur in the folding region. That is, as the elastic member 1000 is repeatedly folded and restored, a magnitude of flatness of the folding region may be increased. In detail, flatness defined as a difference between the highest and lowest heights of a surface in the folding region of the elastic member 1000 may be increased.

In addition, since the elastic member 1000 has a different curvature size for each position of the folding region in the folding and restoration processes, different compressive stress and tensile stress may occur for each position of the folding region.

Accordingly, as a difference in flatness occurs differently for each position of the folding region in the folding region, the magnitude of flatness may increase at a specific point of the folding region or the magnitude of flatness may be formed unevenly in the entire region of the folding region.

Hereinafter, the elastic member capable of preventing unevenness in flatness in the folding region when the elastic member is folded and restored by controlling a size, position, and the like of the pattern portion formed in the folding region of the elastic member and a pattern formed will be described.

First, an elastic member according to a first embodiment will be described with reference to FIGS. 5 to 14.

Referring to FIG. 5, the elastic member 1000 may include a plurality of pattern portions PA. In detail, the elastic member 1000 may include a first pattern portion PA1 disposed in the first region 1A. The first pattern portion PA1 may reduce compressive stress and tensile stress that are generated when the elastic member 1000 is folded and restored.

The first pattern portion PA1 may be formed in a hole or groove shape.

In detail, the first pattern portion PA may be formed in a hole shape penetrating the first surface 1S and the second surface 2S opposite to the first surface 1S of the elastic member 1000. Alternatively, the first pattern portion PA may be formed in a groove shape formed on the first surface 1S or the second surface 2S.

The first pattern portion PA1 disposed in the first region 1A, which is a region where the elastic member 1000 is folded, may easily fold the elastic member 1000. In detail, a thickness of the elastic member 1000 is reduced in the region where the elastic member 1000 is folded by the first pattern part PA1, and accordingly, the compression stress is reduced, and thus it is possible to easily fold the elastic member 1000.

The elastic member 1000 may include a hinge portion HN. In detail, a plurality of hinge portions HN may be disposed in the first region 1A of the elastic member 1000. The hinge portion HN is a region where an end region of the elastic member 1000 is opened for folding of the elastic member 1000 and may be formed only in the first region 1A. Accordingly, the hinge portion HN is a point at which folding of the elastic member 1000 is started, and the first region 1A and the second region 2A may be divided according to whether the hinge portion is formed or not.

A plurality of columns may be defined in the first region 1A according to a position of the folding axis FAX. In detail, the first region 1A may include the plurality of columns extending in the first direction 1D, and the plurality of columns may include columns disposed close to the folding axis FAX in the second direction 2D and columns disposed far away therefrom.

For example, referring to FIGS. 5 and 6, the first region 1A may include a first column Y1 disposed close to the folding axis FAX. In addition, the first region 1A may include columns Y2, Y3 . . . Yn (n is a natural number) that are disposed farther from the folding axis FAX in the second direction 2D than the first column Y1. For example, when n is 3, the first region 1A may include a first column Y1, a second column Y2, and a third column Y3. That is, the first column Y1, the second row Y2, and the third row Y3 extending in the first direction 1D may be sequentially disposed in the second direction 2D around the folding axis.

In addition, the first region 1A may further include at least one of a fourth column Y4 and a fifth column Y5. In addition, the first region 1A may further include a sixth column, a seventh column, or more columns.

Hereinafter, for convenience of description, it will be mainly described that a case in which n is 5, that is, the first region includes the first to fifth columns.

The first pattern portion PA1 disposed in the first region 1A may include a plurality of pattern regions defined by a position of the first pattern portion PA1.

In detail, the first pattern portion PA1 may include a plurality of pattern regions defined by a distance from the folding axis FAX. The plurality of pattern regions may be disposed in each of the plurality of columns.

For example, the first pattern portion PA1 may include a first pattern region P1. The first pattern region P1 may be disposed close to the folding axis FAX. In detail, the first pattern region P1 may be disposed in the first column Y1. That is, the first pattern region P1 may be defined as a set of a plurality of patterns P disposed to be spaced apart from the first column Y1 in the first direction 1D.

In addition, the first pattern portion PA1 may include pattern regions (P2, P3 . . . Pn, n is a natural number) that are disposed farther from the folding axis FAX in the second direction 2D than the first pattern region P1. For example, when n is 5, the first pattern portion PA1 may include a second pattern region P2 disposed in the second column Y2, a third pattern region P3 disposed in the third column Y3, a fourth pattern region P4 disposed in the fourth column Y2, and a fifth pattern region P5 disposed in the fifth column Y5.

Hereinafter, for convenience of description, a case in which n is 5 will be mainly described.

The first column Y1 may be disposed to overlap or adjacent to the folding axis FAX. For example, as shown in FIG. 5, the first column Y1 may overlap the folding axis FAX. That is, the folding axis FAX may pass through the first column Y1. Accordingly, the first pattern region P1 may be disposed in a region overlapping the folding axis FAX.

Alternatively, as shown in FIG. 6, the first column Y1 may be disposed adjacent to the folding axis FAX. In this case, the first column Y1 may include two columns. In detail, the first column Y1 may include a 1 column Y1 adjacent to the left side of the folding tip FAX and a 1 column Y1 adjacent to the right side of the folding tip FAX based on the second direction 2D. That is, the folding axis FAX may not pass through the first column Y1. That is, the folding axis FAX may pass through between the first rows Y1.

The pattern P of the first pattern region P1 and the pattern P of the second pattern region P2 may have different sizes.

A size of the pattern P may be defined by a length of the pattern P in the first direction 1D and a width of the pattern P in the second direction 2D. For example, the pattern P may be formed of a groove or a hole, and in this case, the size of the pattern P may be defined as an area of the groove or the hole. That is, the size of the pattern P may be defined as an opening area of the groove or the hole. The size of the pattern P of the first pattern region P1 may be greater than the size of the pattern P of the second pattern region P2.

For example, referring to FIG. 6, the pattern P of the first pattern region P1 and the pattern P of the second pattern region P2 may have the same length, and a width w1 of the pattern P of the first pattern region P1 may be greater than a width w2 of the pattern P of the second pattern region P2.

Alternatively, referring to FIG. 7, the pattern P of the first pattern region P1 and the pattern P of the second pattern region P2 may have the same width, and a length L1 of the pattern P may be greater than a length L2 of the pattern P in the second pattern region P2.

Alternatively, referring to FIG. 8, the width and length of the pattern P of the first pattern region P1 may be greater than the width and length of the pattern P of the second pattern region P2.

In addition, the size of the pattern P of the first pattern region P1 may be greater than sizes of the pattern P of the third pattern region P3, the fourth pattern region P4, and the fifth pattern region P5.

Referring to FIG. 6, the pattern P of the first pattern region P1, the pattern P of the third pattern region P3, the fourth pattern region P4, and the fifth pattern region P5 may have the same length, and the width w1 of the pattern P of the first pattern region P1 may be greater than a width w3 of the pattern P of the third pattern region P3, a width w4 of the pattern P of the fourth pattern region P4, and a width w5 of the pattern P of the fifth pattern region P5.

Alternatively, referring to FIG. 7, the pattern P of the first pattern region P1, the pattern P of the third pattern region P3, the pattern P of the fourth pattern region P4, and the pattern P of the fifth pattern region P5 may have the same width, and the length L1 of the pattern P of the first pattern region P1 may be greater than a length L3 of the pattern P of the third pattern region P3, a length L4 of the pattern P of the fourth pattern region P4, and a length L5 of the pattern P of the fifth pattern region P5.

Alternatively, referring to FIG. 8, the width and length of the pattern P of the first pattern region P1 may be greater than the width and length of the pattern P of the third pattern region P3, the fourth pattern region P4, and the fifth pattern region P5.

In addition, the size of the pattern P of the second pattern region P2 may be different from a size of the pattern P of the third pattern region P3, a size of the pattern P of the fourth pattern region P4, and a size of the pattern P of the fifth pattern region P5.

For example, the size of the pattern P of the second pattern region P2 may be greater than the size of the pattern P of the third pattern region P3, the size of the pattern P of the third pattern region P3 may be greater than the size of the pattern P of the fourth pattern region P4, and the size of the pattern P of the fourth pattern region P4 may be greater than the size of the pattern P of the fifth pattern region P5.

In detail, as the second pattern region P2, the third pattern region P3, the fourth pattern region P4, and the fifth pattern region P5 are far away from the folding axis in the second direction 2D, the size of the pattern P may decrease.

Referring to FIG. 6, the pattern P of the second pattern region P2, the pattern P of the third pattern region P3, the fourth pattern region P4, and the fifth pattern region P5 may have the same length, the width w2 of the pattern P of the second pattern region P2 may be greater than the width w3 of the pattern P of the third pattern region P3, the width w3 of the pattern P of the third pattern region P3 may be greater than the width w4 of the pattern P of the fourth pattern region P4, and the width w4 of the pattern P of the fourth pattern region P4 may be greater than the width w5 of the pattern P of the fifth pattern region P5.

Alternatively, referring to FIG. 7, the pattern P of the second pattern region P2, the pattern P of the third pattern region P3, the pattern P of the fourth pattern region P4, and the pattern P of the fifth pattern region P5 may have the same width, the length L2 of the pattern P of the second pattern region P2 may be greater than the length L3 of the pattern P of the third pattern region P3, the length L3 of the pattern P in the pattern region P3 may be greater than the length L4 of the pattern P in the fourth pattern region P4, and the length L4 of the pattern P in the fourth pattern region P4 may be greater than the length L5 of the pattern P of the fifth pattern region P5.

Alternatively, referring to FIG. 8, the width and length of the pattern P of the second pattern region P2 may be greater than the width and length of the pattern P of the third pattern region P3, the width and length of the pattern P of the third pattern region P3 may be greater than the width and length of the pattern P of the fourth pattern region P4, and the width and length of the pattern P of the fourth pattern region P4 may be greater than the length of the pattern P of the fifth pattern region P5.

In addition, the pattern P of the first pattern region P1 and the pattern P of the second pattern region P2 may have different opening areas. Here, the opening area may be defined as an opening area of the first pattern portion PA1 determined by the width and length of the pattern P in the hole or groove formed in the first region 1A.

A size of an opening area of the first pattern region P1 may be greater than a size of an opening area of the second pattern region P2. In detail, referring to FIGS. 5 to 8, the opening area of the first pattern region P1 may be greater than the opening area of the second pattern region P2.

In addition, the size of the opening area of the first pattern region P1 may be greater than a size of an opening area of the third pattern region P3, the fourth pattern region P4, and the fifth pattern region P5. In detail, referring to FIGS. 5 to 8, the opening area of the first pattern region P1 may be greater than the opening area of the third pattern region P3, the fourth pattern region P4, and the fifth pattern region P5.

In addition, the size of the opening area of the second pattern region P2 may be different from the size of the opening area of the third pattern region P3, the size of the opening area of the pattern P of the fourth pattern region P4, and the size of the opening area of the pattern P of the fifth pattern region P5.

For example, referring to FIGS. 5 to 8, the size of the opening area of the second pattern region P2 may be greater than the size of the opening area of the third pattern region P3, the size of the opening area of the third pattern region P3 may be greater than the size of the opening area of the pattern P of the fourth pattern region P4, and the size of the opening area of the pattern P of the fourth pattern region P4 may be greater than the size of the opening area of the pattern P of the fifth pattern region P5.

In detail, as the second pattern region P2, the third pattern region P3, the fourth pattern region P4, and the fifth pattern region P5 are farther away from the folding axis in the second direction 2D, the size of the opening area of the pattern P may decrease.

In the elastic member according to the first embodiment, a size of a pattern disposed in a column of the first region 1A and a size of an opening area formed by the pattern may change as the distance from the folding axis FAX increases.

In detail, as the distance from the folding axis increases, the size of the pattern disposed in the column of the first region 1A may decrease. In other words, the size of the pattern disposed in the column of the first region 1A may increase as it approaches the folding axis.

In addition, as the distance from the folding axis increases, the size of the opening area formed in the column of the first region 1A may decrease. In other words, a size of an opening region formed in the column of the first region 1A may increase as it approaches the folding axis.

Accordingly, when the first region, which is the folding region of the elastic member, is formed in a shape in which the compressive stress and the tensile stress decrease as the distance from the folding axis increases, the size of the pattern and the size of the opening area in the first region is decreased as the distance from the folding axis in the first region increases, and thus the elastic force of the first region may be secured at a position where the stress is relatively small by varying the opening area according to a magnitude of the stress generated in each region.

Therefore, it is possible to improve the folding reliability by controlling the size of the pattern and the size of opening area for relieving the compressive stress and tensile stress generated due to folding and restoring in the first region, and a magnitude of flatness in the first region may be decreased by securing sufficient elastic force, and thus it is possible to improve the uniformity of flatness.

Meanwhile, the first pattern portions PA1 formed in the first region of the elastic member 1000 may be disposed in a shape having a different size.

FIGS. 9 to 11 are views illustrating another top view of the elastic member according to the first embodiment.

Referring to FIGS. 9 to 11, the size of the pattern P of the second pattern region P2 may be different from the size of the pattern P of the third pattern region P3, the size of the pattern P of the fourth pattern region P4, and the size of the pattern P of the fifth pattern region P5. In detail, the first region 1A may include an increasing region where the size of the pattern regions increases while extending in the second direction 2D.

In detail, as the second pattern region P2, the third pattern region P3, the fourth pattern region P4, and the fifth pattern region P5 move away from the folding axis in the second direction 2D, the size of the pattern P may decrease and increase. That is, the pattern of the second pattern region P2, the third pattern region P3, the fourth pattern region P4, and the fifth pattern region P5 may decrease and increase while moving away from the folding axis in the second direction 2D.

For example, the size of the pattern P of the second pattern region P2 may be greater than the size of the pattern P of the third pattern region P3, the size of the pattern P of the third pattern region P3 may be smaller than the size of the pattern P of the fourth pattern region P4, and the size of the pattern P of the fourth pattern region P4 may be smaller than the size of the pattern P of the fifth pattern region P5.

That is, the first pattern portion PA1 of the first region 1A may include a region where the size of the pattern decreases and then increases while moving away from the folding axis.

Referring to FIG. 9, the pattern P of the second pattern region P3, the pattern P of the third pattern region P3, the pattern P of the fourth pattern region P4, and the pattern P of the fifth pattern region P5 may have the same length, the width w2 of the pattern P of the second pattern region P2 may be greater than the width w3 of the pattern P of the third pattern region P3, the width w3 of the third pattern P of the region P3 may be smaller than the width w4 of the pattern P of the fourth pattern region P4, and the width w4 of the pattern P of the fourth pattern region P4 may be smaller than the width w5 of the pattern P of the fifth pattern region P5.

Alternatively, referring to FIG. 10, the pattern P of the second pattern region P3, the pattern of the third pattern region P3, the pattern of the fourth pattern region P4, and the pattern of the fifth pattern region P5. P may have the same width, the length L2 of the pattern P of the second pattern region P1 may be greater than the length L3 of the pattern P of the third pattern region P3, the length L3 of the pattern P in the third pattern region P3 may be smaller than the length L4 of the pattern P in the fourth pattern region P4, and the length L4 of the pattern P in the fourth pattern region P4 may be smaller than the length L5 of the pattern P of the fifth pattern region P5.

Alternatively, referring to FIG. 11, the width and length of the pattern P of the second pattern region P1 may be greater than the width and length of the pattern P of the third pattern region P3, and the width and length of the pattern P of the third pattern region P3 may be smaller than the width and length of the pattern P of the fourth pattern region P4, and the width and length of the pattern P of the fourth pattern region P4 may be smaller than the length of the pattern P of the fifth pattern region P5.

FIGS. 9 to 11 illustrate only a region where the size of the pattern decreases and then increases as the first pattern portion PA1 of the first region 1A moves away from the folding axis, but the embodiment is not limited thereto. That is, as the first pattern portion PA1 of the first region 1A moves away from the folding axis, the size of the pattern may increase and then decrease, or decrease and increase and then decrease again.

In addition, the size of the opening area of the second pattern region P2 may be different from the size of the opening area of the third pattern region P3, the size of the opening area of the pattern P of the fourth pattern region P4, and the size of the opening area of the pattern P of the fifth pattern region P5.

In detail, as the second pattern region P2, the third pattern region P3, the fourth pattern region P4, and the fifth pattern region P5 move away from the folding axis in the second direction 2D, the size of the opening area of the pattern P may decrease and increase.

For example, referring to FIGS. 9 to 11, the size of the opening area of the second pattern region P2 may be greater than the size of the opening area of the third pattern region P3, the size of the opening area of the third pattern region P3 may be smaller than the size of the opening area of the pattern P of the fourth pattern region P4, and the size of the opening area of the pattern P of the fourth pattern region P4 may be smaller than the size of the opening area of the pattern P of the fifth pattern region P5.

FIGS. 9 to 11 illustrate only a region where the size of the opening area decreases and then increases as the first pattern portion PA1 of the first region 1A moves away from the folding axis, but the embodiment is not limited thereto. That is, as the first pattern portion PA1 of the first region 1A moves away from the folding axis, the size of the opening area may increase and then decrease, or decrease and increase and then decrease again.

In the elastic member according to the first embodiment, the size of the pattern disposed in the column of the first region 1A and the size of the opening area formed by the pattern may change as the distance from the folding axis FAX increases.

In detail, as the distance from the folding axis increases, the size of the pattern disposed in the column of the first region 1A may decrease or increase. In other words, the size of the pattern disposed in the column of the first region 1A may increase or decrease as it approaches the folding axis.

In addition, as the distance from the folding axis increases, the size of the opening area formed in the column of the first region 1A may decrease or increase. In other words, the size of the opening region formed in the column of the first region 1A may increase or decrease as it approaches the folding axis.

Accordingly, when the first region, which is the folding region of the elastic member, is formed in a shape in which the compressive stress and the tensile stress change as the distance from the folding axis increases, the size of the pattern and the size of the opening area of the pattern in the first region may be changed according to a shape in which the stress is changed.

Therefore, it is possible to secure the elastic force according to the stress generated in each region by varying the size of the pattern and the size of the opening area according to a magnitude of the stress generated in each region according to the folding shape of the elastic member.

Meanwhile, the first pattern portion PA1 formed in the first region of the elastic member 1000 may be disposed in still another shape.

FIGS. 12 to 14 are views illustrating still another top view of the elastic member according to the first embodiment.

Referring to FIGS. 12 to 14, the size of the pattern P of the second pattern region P2 may be different from the size of the pattern P of the third pattern region P3, the size of the pattern P of the fourth pattern region P4, and the size of the pattern P of the fifth pattern region P5. In detail, the first region 1A may include a holding region where sizes of the pattern regions are not changed while extending in the second direction 2D.

In detail, as the second pattern region P2, the third pattern region P3, the fourth pattern region P4, and the fifth pattern region P5 move away from the folding axis in the second direction 2D, the size of the pattern P may decrease and be maintained. That is, the pattern of the second pattern region P2, the third pattern region P3, the fourth pattern region P4, and the fifth pattern region P5 may include a region that decreases and then is maintained while moving away from the folding axis in the second direction 2D.

For example, the size of the pattern P of the second pattern region P2 may be greater than the size of the pattern P of the third pattern region P3, the size of the pattern P of the third pattern region P3 may be greater than the size of the pattern P of the fourth pattern region P4, and the size of the pattern P of the fourth pattern region P4 and the size of the pattern P of the fifth pattern region P5 may be the same within a tolerance range.

That is, the first pattern portion PA1 of the first region 1A may include a region where the size of the pattern decreases and then is maintained while moving away from the folding axis.

Referring to FIG. 12, the pattern P of the second pattern region P3, the pattern P of the third pattern region P3, the pattern P of the fourth pattern region P4, and the pattern P of the fifth pattern region P5 may have the same length, the width w2 of the pattern P of the second pattern region P1 may be greater than the width w3 of the pattern P of the third pattern region P3, the width w3 of the third pattern P of the region P3 may be greater than the width w4 of the pattern P of the fourth pattern region P4, and the width w4 of the pattern P of the fourth pattern region P4 and the width w5 of the pattern P of the fifth pattern region P5 may be the same within a tolerance range.

Alternatively, referring to FIG. 13, the pattern P of the second pattern region P3, the pattern of the third pattern region P3, the pattern of the fourth pattern region P4, and the pattern of the fifth pattern region P5. P may have the same width, the length L2 of the pattern P of the second pattern region P1 may be greater than the length L3 of the pattern P of the third pattern region P3, the length L3 of the pattern P in the third pattern region P3 may be greater than the length L4 of the pattern P in the fourth pattern region P4, and the length L4 of the pattern P in the fourth pattern region P4 and the length L5 of the pattern P of the fifth pattern region P5 may be the same within a tolerance range.

Alternatively, referring to FIG. 14, the width and length of the pattern P of the second pattern region P1 may be greater than the width and length of the pattern P of the third pattern region P3, and the width and length of the pattern P of the third pattern region P3 may be greater than the width and length of the pattern P of the fourth pattern region P4, and the width and length of the pattern P of the fourth pattern region P4 and the length of the pattern P of the fifth pattern region P5 may be the same within a tolerance range.

FIGS. 12 to 14 illustrate only a region where the size of the pattern decreases and then is maintained as the first pattern portion PA1 of the first region 1A moves away from the folding axis, but the embodiment is not limited thereto. That is, as the first pattern portion PA1 of the first region 1A moves away from the folding axis, the size of the pattern may decrease and be maintained and then increase again, or decrease and be maintained and then decrease again.

In addition, the size of the opening area of the second pattern region P2 may be different from the size of the opening area of the third pattern region P3, the size of the opening area of the pattern P of the fourth pattern region P4, and the size of the opening area of the pattern P of the fifth pattern region P5. In detail, the first region 1A may include a holding region where the size of the opening area is not changed while extending in the second direction 2D.

In detail, as the second pattern region P2, the third pattern region P3, the fourth pattern region P4, and the fifth pattern region P5 move away from the folding axis in the second direction 2D, the size of the opening area of the pattern P may decrease and be maintained.

For example, referring to FIGS. 12 to 14, the size of the opening area of the second pattern region P2 may be greater than the size of the opening area of the third pattern region P3, the size of the opening area of the third pattern region P3 may be greater than the size of the opening area of the pattern P of the fourth pattern region P4, and the size of the opening area of the pattern P of the fourth pattern region P4 and the size of the opening area of the pattern P of the fifth pattern region P5 may be the same within a tolerance range.

FIGS. 12 to 14 illustrate only a region where the size of the opening area decreases and then increases as the first pattern portion PA1 of the first region 1A moves away from the folding axis, but the embodiment is not limited thereto. That is, as the first pattern portion PA1 of the first region 1A moves away from the folding axis, the size of the opening area may decrease and be maintained and then increase again, or may decrease and be maintain and then decrease again.

In the elastic member according to the first embodiment, the size of a pattern disposed in the column of the first region 1A and the size of an opening area formed by the pattern may be changed as the distance from the folding axis FAX increases.

In detail, as the distance from the folding axis increases, the size of the pattern disposed in the column of the first region 1A may increase, decrease, or be maintained. In other words, the size of the pattern disposed in the column of the first region 1A may increase, decrease, or be maintained as it approaches the folding axis.

In addition, as the distance from the folding axis increases, the size of the opening area formed in the column of the first region 1A may increase, decrease, or be maintained. In other words, the size of the opening region formed in the column of the first region 1A may increase, decrease, or be maintained as it approaches the folding axis.

Accordingly, when the first region, which is the folding region of the elastic member, is formed in a shape in which the compressive stress and the tensile stress change as the distance from the folding axis increases, the size of the pattern and the size of the opening area of the pattern in the first region may be changed according to a shape in which the stress is changed.

Therefore, it is possible to secure the elastic force according to the stress generated in each region by varying the size of the pattern and the size of the opening area according to a magnitude of the stress generated in each region according to the folding shape of the elastic member.

Meanwhile, in the elastic member 1000 according to the embodiment, a spacing of the pattern of the first pattern portion PA1 may be changed while the size of the first pattern portion PA1 is maintained.

Hereinafter, an elastic member according to a second embodiment will be described with reference to FIGS. 15 and 16.

Referring to FIG. 15, the pattern P of the first pattern region P1 and the pattern P of the second pattern region P2 may be spaced apart from each other by different spacings.

In detail, in the pattern P of the first pattern region P1 and the pattern P of the second pattern region P2, a first spacing in the first direction 1D which is a longitudinal direction of the pattern P may be different.

In detail, the pattern P of the first pattern region P1 and the pattern P of the second pattern region P2 may have the same size, and a 1-1 spacing d1-1 of the pattern P of the first pattern region P1 may be smaller than a 1-2 spacing d1-2 of the pattern P of the second pattern region P2.

In addition, the size of the pattern P of the first pattern region P1 may be the same as the size of the pattern P of the third pattern region P3, the fourth pattern region P4, and the fifth pattern region P5, and the spacing of the patterns may be different.

In detail, the 1-1 spacing d1-1 of the pattern P of the first pattern region P1 may be smaller than a 1-3 spacing d1-3 of the pattern P of the third pattern region P2, a 1-4 spacing d1-4 of the pattern P of the fourth pattern region P4, and a 1-5 spacing d1-5 of the pattern P of the fifth pattern region P5.

That is, a size of the spacing in the first direction of the pattern of the first pattern portion PA1 of the first pattern region 1A may be gradually increased while extending from the first pattern region P1 in the second direction.

In addition, the 1-2 spacing d1-2 of the pattern P of the second pattern region P2 may be different from the 1-3 spacing d1-3 of the pattern P of the third pattern region P3, the 1-4 spacing d1-4 of the pattern P of the fourth pattern region P4, and the 1-5 spacing d1-5 of the pattern P of the fifth pattern region P5.

For example, referring to FIG. 15, the 1-2 spacing d1-2 of the pattern P of the second pattern region P2 may be smaller than the 1-3 spacing d1-3 of the pattern P of the third pattern region P3, the 1-3 spacing d1-3 of the pattern P of the third pattern region P3 may be smaller than the 1-4 spacing d1-4 of the pattern P of the fourth pattern region P4, and the 1-4 spacing d1-4 of the pattern P of the fourth pattern region P4 may be smaller than the 1-5 spacing d1-5 of the pattern P of the fifth pattern region P5.

That is, the size of the spacing in the first direction of the pattern of the first pattern portion PA1 of the first region 1A may gradually increase while extending in the second direction from the second pattern region P2.

In addition, the 1-2 spacing d1-2 of the pattern P of the second pattern region P2 may be different from the 1-3 spacing d1-3 of the pattern P of the third pattern region P3, the 1-4 spacing d1-4 of the pattern P of the fourth pattern region P4, and the 1-5 spacing d1-5 of the pattern P of the fifth pattern region P5.

For example, the 1-2 spacing d1-2 of the pattern P of the second pattern region P2 may be smaller than the 1-3 spacing d1-3 of the pattern P of the third pattern region P3, the 1-3 spacing d1-3 of the pattern P of the third pattern region P3 may be greater than the 1-4 spacing d1-4 of the pattern P of the fourth pattern region P4, and the 1-4 spacing d1-4 of the pattern P of the fourth pattern region P4 may be greater than the 1-5 spacing d1-5 of the pattern P of the fifth pattern region P5.

That is, the size of the spacing in the first direction of the pattern of the first pattern portion PA1 of the first pattern region 1A may include both a region that decreases and a region that increases while extending from the second pattern region P1 in the second direction.

In addition, the 1-2 spacing d1-2 of the pattern P of the second pattern region P2 may be different from the 1-3 spacing d1-3 of the pattern P of the third pattern region P3, the 1-4 spacing d1-4 of the pattern P of the fourth pattern region P4, and the 1-5 spacing d1-5 of the pattern P of the fifth pattern region P5.

For example, the 1-2 spacing d1-2 of the pattern P of the second pattern region P2 may be smaller than the 1-3 spacing d1-3 of the pattern P of the third pattern region P3, the 1-3 spacing d1-3 of the pattern P of the third pattern region P3 may be smaller than the 1-4 spacing d1-4 of the pattern P of the fourth pattern region P4, and the 1-4 spacing d1-4 of the pattern P of the fourth pattern region P4 and the 1-5 spacing d1-5 of the pattern P of the fifth pattern region P5 may be a same in a tolerance range.

That is, the size of the spacing in the first direction of the pattern of the first pattern portion PA1 of the first pattern region 1A may include both a region that decreases and a region that is maintained while extending from the second pattern region P1 in the second direction.

Alternatively, the size of the spacing in the first direction of the pattern of the first pattern portion PA1 of the first pattern region 1A may include all of a region that decreases, a region that increases, and a region that is maintained while extending from the second pattern region P1 in the second direction.

Referring to FIG. 16, the pattern P of the first pattern region P1 and the pattern P of the second pattern region P2 may be spaced apart from each other by different spacings.

In detail, in the pattern P of the first pattern region P1 and the pattern P of the second pattern region P2, a second spacing in the second direction 2D which is a width direction of the pattern P may be different.

In detail, the pattern P of the first pattern region P1 and the pattern P of the second pattern region P2 may have the same size, a 2-1 spacing d2-1 of the pattern P of the first pattern region P1 may be smaller than a 2-2 spacing d2-2 of the pattern P of the second pattern region P2.

In addition, the size of the pattern P of the first pattern region P1 may be the same as the size of the pattern P of the third pattern region P3, the fourth pattern region P4, and the fifth pattern region P5, and the spacing of the patterns may be different.

In detail, the 2-1 spacing d2-1 of the pattern P of the first pattern region P1 may be smaller than a 2-3 spacing d2-3 of the pattern P of the third pattern region P2, a 2-4 spacing d2-4 of the pattern P of the fourth pattern region P4, and a 2-5 spacing d2-5 of the pattern P of the fifth pattern region P5.

That is, a size of the spacing in the first direction of the pattern of the first pattern portion PA1 of the first region 1A may be gradually increased while extending from the first pattern region P1 in the second direction.

In addition, the 2-2nd spacing d2-2 of the pattern P of the second pattern region P2 may be different from the 2-3 spacing d2-3 of the pattern P of the third pattern region P3, the 2-4 spacing d2-4 of the pattern P of the fourth pattern region P4, and the 2-5 spacing d2-5 of the pattern P of the fifth pattern region P5.

For example, referring to FIG. 16, the 2-2 spacing d2-2 of the pattern P of the second pattern region P2 may be smaller than the 2-3 spacing d2-3 of the pattern P of the third pattern region P3, the 2-3 spacing d2-3 of the pattern P of the third pattern region P3 may be smaller than the 2-4 spacing d2-4 of the pattern P of the fourth pattern region P4, and the 2-4 spacing d2-4 of the pattern P of the fourth pattern region P4 may be smaller than the 2-5 spacing d2-5 of the pattern P of the fifth pattern region P5.

That is, the size of the spacing in the first direction of the pattern of the first pattern portion PA1 of the first region 1A may gradually increase while extending in the second direction from the second pattern region P2.

In addition, the 2-2 spacing d2-2 of the pattern P of the second pattern region P2 may be different from the 2-3 spacing d2-3 of the pattern P of the third pattern region P3, the 2-4 spacing d2-4 of the pattern P of the fourth pattern region P4, and the 2-5 spacing d2-5 of the pattern P of the fifth pattern region P5.

For example, the 2-2 spacing d2-2 of the pattern P of the second pattern region P2 may be smaller than the 2-3 spacing d2-3 of the pattern P of the third pattern region P3, the 2-3 spacing d2-3 of the pattern P of the third pattern region P3 may be greater than the 2-4 spacing d2-4 of the pattern P of the fourth pattern region P4, and the 2-4 spacing d2-4 of the pattern P of the fourth pattern region P4 may be greater than the 2-5 spacing d2-5 of the pattern P of the fifth pattern region P5.

That is, the size of the spacing in the first direction of the pattern of the first pattern portion PA1 of the first pattern region 1A may include both a region that decreases and a region that increases while extending from the second pattern region P1 in the second direction.

In addition, the 2-2 spacing d2-2 of the pattern P of the second pattern region P2 may be different from the 2-3 spacing d2-3 of the pattern P of the third pattern region P3, the 2-4 spacing d2-4 of the pattern P of the fourth pattern region P4 and the 2-5 spacing d2-5 of the pattern P of the fifth pattern region P5.

For example, the 2-2 spacing d2-2 of the pattern P of the second pattern region P2 may be smaller than the 2-3 spacing d2-3 of the pattern P of the third pattern region P3, the 2-3 spacing d2-3 of the pattern P of the third pattern region P3 may be smaller than the 2-4 spacing d2-4 of the pattern P of the fourth pattern region P4, and the 2-4 spacing d2-4 of the pattern P of the fourth pattern region P4 and the 2-5 spacing d2-5 of the pattern P of the fifth pattern region P5 may be a same in a tolerance range.

That is, the size of the spacing in the first direction of the pattern of the first pattern portion PA1 of the first pattern region 1A may include both a region that decreases and a region that is maintained while extending from the second pattern region P1 in the second direction.

Alternatively, the size of the spacing in the first direction of the pattern of the first pattern portion PA1 of the first pattern region 1A may include all of a region that decreases, a region that increases, and a region that is maintained while extending from the second pattern region P1 in the second direction.

In the elastic member according to the second embodiment, a size of a spacing of the patterns disposed in the column of the first region 1A may be changed.

In detail, the spacing of the pattern disposed in the column of the first region 1A may increase while extending in the first direction and the second direction.

Accordingly, when the first region, which is the folding region of the elastic member, is formed in a shape in which the compressive stress and the tensile stress decrease as the distance from the folding axis increases, the size of the spacing of the pattern is increased as the distance from the folding axis in the first region increases, and thus the elastic force of the first region may be secured at a position where the stress is relatively small by varying the spacing of the pattern according to the magnitude of the stress generated in each region.

Therefore, it is possible to improve the folding reliability by controlling the spacing of the pattern for relieving the compressive stress and tensile stress generated due to folding and restoring in the first region, and a magnitude of flatness in the first region may be decreased by securing sufficient elastic force, and thus it is possible to improve the uniformity of flatness.

In addition, in the elastic member according to the second embodiment, the spacing of the pattern disposed in the column of the first region 1A may decrease, increase, or be maintained.

Accordingly, when the first region, which is the folding region of the elastic member, is formed in the shape in which the compressive stress and the tensile stress change as the distance from the folding axis increases, the spacing of the pattern in the first region may be appropriately changed depending on the shape in which the stress changes.

Therefore, it is possible to secure the elastic force according to the stress generated in each region by varying the spacing of the pattern according to the magnitude of the stress generated in each region according to the folding shape of the elastic member.

Meanwhile, in the elastic member 1000 according to the embodiment, the patterns of the first pattern portion PA1 may be disposed in a direction in which the patterns overlap each other.

Hereinafter, an elastic member according to a third embodiment will be described with reference to FIGS. 17 to 19.

Referring to FIGS. 17 to 19, the first pattern portion PA1 may include a 1-1 pattern portion PA1-1 and a 1-2 pattern portion PA1-2, and the 1-1 pattern portion PA1-1 and the 1-2 pattern portion PA1-2 may be disposed at a position that partially overlaps in the second direction 2D.

The 1-1 pattern portion PA1-1 may include a first central pattern CP1 disposed at the most center thereof and a first outer pattern OP1 disposed on the left and right sides in the second direction 2D from the first central pattern CP1.

In detail, the 1-1 pattern portion PA1-1 may include one first central pattern CP1 and a plurality of first outer patterns OP1 disposed on the left and right sides in the second direction 2D from the first central pattern CP1. That is, the first central pattern CP1 may be formed as a single pattern, and the first outer pattern OP1 may be formed as a pair of two patterns facing each other in the second direction.

A length of the first central pattern CP1 in the first direction may be greater than a length of the first outer patterns OP1.

In the first outer pattern OP1, the plurality of first outer patterns may be disposed to be spaced apart from each other in the second direction based on the first central pattern CP1.

For example, the first outer pattern OP1 may include a 1-1 outer pattern OP1-1 to a 1-n outer pattern OP1-*n* (n is a natural number) that are sequentially disposed to be spaced apart from the first central pattern CP1.

FIG. 18 illustrates a case in which n is 15, the embodiment is not limited thereto, and n may be 14 or less or 16 or more.

For example, when n is 15, the first outer pattern OP1 may include the 1-1 outer pattern OP1-1 disposed closest to the first central pattern CP1, a 1-2 outer pattern OP1-2 disposed adjacent to the outer pattern OP1-1, a 1-3 first outer pattern OP1-3 disposed adjacent to the 1-2 outer pattern OP1-2, a 1-4 outer pattern OP1-4 disposed adjacent to the 1-3 outer pattern OP1-3, a 1-5 outer pattern OP1-5 disposed adjacent to the 1-4 outer pattern OP1-4, a 1-6 outer pattern OP1-6 disposed adjacent to the 1-5 outer pattern OP1-5, a 1-7 outer pattern OP1-7 disposed adjacent to the 1-6 outer pattern OP1-6, a 1-8 outer pattern OP1-8 disposed adjacent to the 1-7 outer pattern OP1-7, a 1-9 outer pattern OP1-9 disposed adjacent to the 1-8 outer pattern OP1-8, a 1-10 outer pattern OP1-10 disposed adjacent to the 1-9 outer pattern OP1-9, a 1-11 outer pattern OP1-11 disposed adjacent to the 1-10 outer pattern OP1-10, a 1-12 outer pattern OP1-12 disposed adjacent to the 1-11 outer pattern OP1-11, a 1-13 outer pattern OP1-13 disposed adjacent to the 1-12 outer pattern OP1-12, a 1-14 outer pattern OP1-14 disposed adjacent to the 1-13 outer pattern OP1-13, and a 1-15 outer pattern OP1-15 disposed adjacent to the 1-14 outer pattern OP1-14.

In the 1-1 outer pattern OP1-1, the 1-2 outer pattern OP1-2, the 1-3 outer pattern OP1-3, the 1-4 outer pattern OP1-4, the 1-5 outer pattern OP1-5, the 1-6 outer pattern OP1-6, the 1-7 outer pattern OP1-7, the 1-8 outer pattern OP1-8, the 1-9 outer pattern OP1-9, the 1-10 outer pattern OP1-10, the 1-11 outer pattern OP1-11, the 1-12 outer pattern OP1-12, the 1-13 outer pattern OP1-13, the 1-14 outer pattern OP1-14, and the 1-15 outer pattern OP1-15, a length of the pattern may be gradually decreased while extending from the first central pattern CP1 in the second direction 2D.

For example, in the first outer patterns OP1, the length of the pattern may be gradually decreased while extending from the first central pattern CP1 in the second direction 2D so that the overall edge shape of the 1-1 pattern portion PA1-1 is formed in a diamond shape.

In addition, the first 1-2 pattern portions PA1-2 may include a second central pattern CP2 disposed at the most center thereof and a second outer pattern OP2 disposed on the left and right sides in the second direction 2D from the second central pattern CP2.

In detail, the first 1-2 pattern portion PA1-2 may include two second central patterns CP2 and a plurality of second outer pattern OP2 disposed on the left and right sides in the second direction 2D from the second central pattern CP2. That is, the second central pattern CP2 and the second outer pattern OP2 may be formed as a pair of two patterns facing each other in the second direction.

A length of the second central pattern CP2 in a first direction may be greater than a length of the second outer patterns OP2.

In the second outer pattern OP2, the plurality of second outer patterns may be disposed to be spaced apart from each other in the second direction based on the second central pattern CP2.

For example, the second outer pattern OP2 may include a 2-1 outer pattern OP2-1 to a 2-m outer pattern OP2-*m* (m is a natural number) that are sequentially disposed to be spaced apart from the second central pattern CP2.

FIG. 18 illustrates a case in which m is 14, the embodiment is not limited thereto, and m may be 13 or less or 15 or more.

For example, when m is 14, the second outer pattern OP2 may include the 2-1 outer pattern OP2-1 disposed closest to the second central pattern CP2, a 2-2 outer pattern OP2-2 disposed adjacent to the outer pattern OP2-1, a 2-3 outer pattern OP2-3 disposed adjacent to the 2-2 outer pattern OP2-2, a 2-4 outer pattern OP2-4 disposed adjacent to the 2-3 outer pattern OP2-3, a 2-5 outer pattern OP2-5 disposed adjacent to the 2-4 outer pattern OP2-4, a 2-6 outer pattern OP2-6 disposed adjacent to the 2-5 outer pattern OP2-5, a 2-7 outer pattern OP2-7 disposed adjacent to the 2-6 outer pattern OP2-6, a 2-8 outer pattern OP2-8 disposed adjacent to the 2-7 outer pattern OP2-7, a 2-9 outer pattern OP2-9 disposed adjacent to the 2-8 outer pattern OP2-8, a 2-10 outer pattern OP2-10 disposed adjacent to the 2-9 outer pattern OP2-9, a 2-11 outer pattern OP2-11 disposed adjacent to the 2-10 outer pattern OP2-10, a 2-12 outer pattern OP2-12 disposed adjacent to the 2-11 outer pattern OP2-11, a 2-13 outer pattern OP2-13 disposed adjacent to the 2-12 outer pattern OP2-12, and a 2-14 outer pattern OP2-14 disposed adjacent to the 2-13 outer pattern OP2-13.

In the 2-1 outer pattern OP2-1, the 2-2nd outer pattern OP2-2, the 2-3 outer pattern OP2-3, the 2-4 outer pattern OP2-4, the 2-5 outer pattern OP2-5, the 2-6 outer pattern OP2-6, the 2-7 outer pattern OP2-7, the 2-8 outer pattern OP2-8, the 2-9 outer pattern OP2-9, the 2-10 outer pattern OP2-10, the 2-11 outer pattern OP2-11, the 2-12 outer pattern OP2-12, the 2-13 outer pattern OP2-13, and the 2-14 outer pattern OP2-14, a length of the pattern may be gradually decreased while extending from the second central pattern CP2 in the second direction 2D.

For example, in the second outer patterns OP2, the length of the pattern may be gradually decreased while extending from the second central pattern CP2 in the second direction 2D so that the overall edge shape of the first 1-2 pattern portion PA1-2 is formed in the diamond shape.

The 1-1 pattern portion PA1-1 and the 1-2 pattern portion PA1-2 may be disposed to overlap in the second direction 2D. In detail, the 1-1 pattern portion PA1-1 and the 1-2 pattern portion PA1-2 may be alternately disposed in the first direction 1D, and the 1-1 pattern portion PA1-1 and the 1-2 pattern portions PA1-2 may be disposed to overlap in the second direction 2D.

In detail, a part of the first central pattern CP1 of the 1-1 pattern portion PA1-1 may be disposed between the second central pattern CP2 of the 1-2 pattern portion PA1-2 and the first central pattern CP1. Accordingly, the second central pattern CP2 may be disposed adjacent to a part of the first central pattern CP1 in a second direction, and the 1-1 outer pattern OP1-1 may be disposed adjacent to a remaining part of the first central pattern CP1 in the second direction.

In addition, some of the first outer patterns OP1 among the plurality of first outer patterns OP1 of the 1-1 pattern portion PA1-1 may be disposed between the second outer patterns OP2. In addition, other first outer patterns among the plurality of first outer patterns OP1 of the 1-1 pattern portion PA1-1 may not be disposed between the second outer patterns OP2.

For example, referring to FIG. 18, the 1-1 outer pattern OP1-1, the 1-2 outer pattern OP1-2, the 1-3 outer pattern OP1-3, the 1-4 outer pattern OP1-4, the 1-5 outer pattern OP1-5, and the 1-6 outer pattern OP1-6 among the first outer patterns OP1 may be disposed between the 2-1 outer pattern OP2-1, the 2-2 outer pattern OP2-2, the 2-3 outer pattern OP2-3, the 2-4 outer pattern OP2-4, the 2-5 outer pattern OP2-5 and the 2-6 outer pattern OP2-6, respectively.

For example, the 1-1 outer pattern OP1-1 may be disposed between the second central pattern CP2 and the 2-1 outer pattern OP2-1, the 1-2 outer pattern OP2-1 may be disposed between the 2-1 outer pattern OP2-1 and the 2-2 outer pattern OP2-2, the 1-3 outer pattern OP1-3 may be disposed between the 2-2 outer pattern OP2-2 and the 2-3 outer pattern OP2-3, the 1-4 outer pattern OP1-4 may be disposed between the 2-3 outer pattern OP2-3 and the 2-4 outer pattern OP2-4, the 1-5 outer pattern OP1-5 may be disposed between the 2-4 outer pattern OP2-4 and the 2-5 outer pattern OP2-5, and the 1-6 outer pattern OP1-6 may be disposed between the 2-5 outer pattern OP2-5 and the 2-6 outer pattern OP2-6.

In addition, the 1-7 outer pattern OP1-7, the 1-8 outer pattern OP1-8, the 1-9 outer pattern OP1-9, the 1-10 outer pattern OP1-10, the 1-11 outer pattern OP1-11, the 1-12 outer pattern OP1-12, the 1-13 outer pattern OP1-13, the 1-14 outer pattern OP1-14, and the 1-15 outer pattern OP1-15 may be spaced apart from the 2-7 outer pattern OP2-7, the 2-8 outer pattern OP2-8, the 2-9 outer pattern OP2-9, the 2-10 outer pattern OP2-10, the 2-11 outer pattern OP2-11, the 2-12 outer pattern OP2-12, the 2-13 outer pattern OP2-13, and the 2-14 outer pattern OP2-14 in the first direction.

Meanwhile, FIG. 18 illustrates that a number of overlapping patterns between the first pattern portion and the second pattern portion is disposed smaller than a number of spaced apart patterns, but the embodiment is not limited thereto, and the number of the overlapping patterns between the first pattern portion and the second pattern portion may be disposed the same as the number of the spaced apart patterns, or the number of the overlapping patterns between the first pattern portion and the second pattern portion may be disposed greater than the number of the spaced apart patterns. For example, the 1-1 outer pattern to the 1-15 outer pattern may overlap the 2-1 outer pattern to the 2-14 outer pattern. Through this, since the elastic force of the first region may be adjusted as needed, it is possible to have a degree of freedom in design so as to secure a required elastic force according to an entire length and width of the elastic member and a length and width of the first region.

FIG. 19 is an enlarged view of region B in FIG. 17 and is a view for describing a hinge portion of the first region.

Referring to FIG. 19, the elastic member according to the third embodiment may include a hinge portion disposed in the first region 1A. The hinge portion may be formed to open an end of the elastic member 1000.

The hinge portion may include a plurality of hinge portions. For example, the hinge portion may include a central hinge portion and an outer hinge portion.

In detail, the hinge portion may include a central hinge portion CHN disposed at the most center and an outer hinge portion OHN disposed the left and right sides in the second direction 2D from the central hinge portion CHN.

In detail, the hinge portion may include two central hinge portions CHN and a plurality of outer hinge portions OHN disposed on the left and right sides in the second direction 2D from the central hinge portion CHN. That is, the central hinge portion CHN and the outer hinge portion OHN may be formed as a pair of two patterns facing each other in the second direction.

A length of the central hinge portion CHN in the first direction may be greater than a length of the outer hinge portions OHN.

In the outer hinge portion OHN, the plurality of outer hinge portions OHN may be disposed to be spaced apart from each other in the second direction based on the central hinge portion CHN.

For example, the outer hinge portion OHN may include a first outer hinge portion OHN1 to a l outer hinge portion OHNl (l is a natural number) that are sequentially disposed to be spaced apart from the central hinge portion CHN.

FIG. 19 illustrates a case in which l is 14, the embodiment is not limited thereto, and l may be 13 or less or 15 or more.

For example, when l is 14, the outer hinge portion OHN may include the first outer hinge portion OHN1 disposed closest to the central hinge portion CHN, a second outer hinge portion OHN2 disposed adjacent to the first outer hinge portion OHN1, a third outer hinge portion OHN3 disposed adjacent to the second outer hinge portion OHN2, a fourth outer hinge portion OHN4 disposed adjacent to the third outer hinge portion OHN3, a fifth outer hinge portion OHN5 disposed adjacent to the fourth outer hinge portion OHN4, a sixth outer hinge portion OHN6 disposed adjacent to the fifth outer hinge portion OHN5, a seventh outer hinge portion OHN7 disposed adjacent to the sixth outer hinge portion OHN6, an eighth outer hinge portion OHN8 disposed adjacent to the seventh outer hinge portion OHN7, a ninth outer hinge portion OHN9 disposed adjacent to the eighth outer hinge portion OHN8, a tenth outer hinge portion OHN10 disposed adjacent to the ninth outer hinge portion OHN9, a eleventh outer hinge portion OHN11 disposed adjacent to the tenth outer hinge portion OHN10, a twelfth outer hinge portion OHN12 disposed adjacent to the eleventh outer hinge portion OHN11, a thirteenth outer hinge portion OHN13 disposed adjacent to the twelfth outer hinge portion OHN12, and a fourteenth outer hinge portion OHN14 disposed adjacent to the thirteenth outer hinge portion OHN13.

In the first outer hinge portion OHN1, the second outer hinge portion OHN2, the third outer hinge portion OHN3, the fourth outer hinge portion OHN4, the fifth outer hinge portion OHN5, the sixth outer hinge portion OHN6, the seventh outer hinge portion OHN7, the eighth outer hinge portion OHN8, the ninth outer hinge portion OHN9, the tenth outer hinge portion OHN10, the eleventh outer hinge portion OHN11, the twelfth outer hinge portion OHN12, the thirteenth outer hinge portion OHN13, and the fourteenth outer hinge portion OHN14, a length of the hinge portion may be decreased while extending from the central hinge portion CHN in the direction 2D.

In addition, in the first outer hinge portion OHN1, the second outer hinge portion OHN2, the third outer hinge portion OHN3, the fourth outer hinge portion OHN4, the fifth outer hinge portion OHN5, the sixth outer hinge portion OHN6, the seventh outer hinge portion OHN7, the eighth outer hinge portion OHN8, the ninth outer hinge portion OHN9, the tenth outer hinge portion OHN10, the eleventh outer hinge portion OHN11, the twelfth outer hinge portion OHN12, the thirteenth outer hinge portion OHN13, and the fourteenth outer hinge portion OHN14, a width of the hinge portion may be decreased while extending from the central hinge portion CHN in the direction 2D.

In addition, in the first outer hinge portion OHN1, the second outer hinge portion OHN2, the third outer hinge portion OHN3, the fourth outer hinge portion OHN4, the fifth outer hinge portion OHN5, the sixth outer hinge portion OHN6, the seventh outer hinge portion OHN7, the eighth outer hinge portion OHN8, the ninth outer hinge portion OHN9, the tenth outer hinge portion OHN10, the eleventh outer hinge portion OHN11, the twelfth outer hinge portion OHN12, the thirteenth outer hinge portion OHN13, and the fourteenth outer hinge portion OHN14, a spacing of the hinge portion may be increased while extending from the central hinge portion CHN in the direction 2D.

In addition, the hinge portion and the 1-1 pattern portion PA1-1 may be disposed to overlap in the second direction 2D.

In detail, at least one of the central hinge portion CHN and the plurality of outer hinge portions may be disposed between the first central pattern CP1 and the plurality of outer patterns of the 1-1 pattern portion PA1-1.

The drawing illustrates that the hinge portion and the 1-1 pattern portion PA1-1 overlap each other, but the embodiment is not limited thereto, and the hinge portion may also overlap the 1-2 pattern portion PA1-2.

Accordingly, in the first pattern portion PA1 according to the third embodiment, it is possible to increase a pattern formation area by disposing to overlap the patterns in a central region of the first region 1A, that is, the folding axis FAX and a region adjacent to the folding axis FAX. In addition, it is possible to relatively decrease the pattern formation area by disposing without overlapping the patterns in an outer region of the first region 1A, that is, a region far from the folding axis FAX.

Accordingly, when the first region, which is the folding region of the elastic member, is formed in the shape in which the compressive stress and the tensile stress change as the distance from the folding axis increases, a size of an area of the pattern is decreased the distance from the folding axis in the first region increases, and thus the elastic force of the first region may be secured at a position where the stress is relatively small by varying the opening area according to the magnitude of the stress generated in each region.

Therefore, it is possible to improve the folding reliability by controlling the area of the pattern for relieving the compressive stress and tensile stress generated due to folding and restoring in the first region, and a magnitude of flatness in the first region may be decreased by securing sufficient elastic force, and thus it is possible to improve the uniformity of flatness.

Meanwhile, in the elastic member according to the embodiment, a pattern portion may be formed in the second region 2A as well.

Hereinafter, an elastic member according to a fourth embodiment will be described with reference to FIG. 20.

Referring to FIG. 20, the elastic member 1000 may further include a second pattern portion PA2. In detail, the elastic member 1000 may further include the second pattern portion PA2 disposed in the second region 2A.

The second pattern portion PA2 may be formed in a hole or groove shape.

In detail, the second pattern portion PA may be formed in a hole shape penetrating the first surface 1S and the second surface 2S of the elastic member 1000. Alternatively, the second pattern portion PA may be formed in a groove shape formed on the first surface 1S or the second surface 2S.

The second pattern portion PA2 disposed in the second region 2A, which is a region where the elastic member 1000 is not folded, may maintain similar physical characteristics of the first region 1A and the second region 2A.

In detail, a difference in deformation due to heat in the first region 1A and the second region 2A in which the first pattern portion PA1 is disposed may be reduced by the second pattern portion PA2. That is, when heat is applied to the elastic member 1000, the difference in deformation due to heat in the first region 1A and the second region 2A may be relieved by forming pattern portions in both the first region 1A and the second region 2A. Accordingly, it is possible to prevent the elastic member 1000 from being bent or twisted due to the difference in deformation between the first region 1A and the second region 2A.

In addition, it is possible to prevent bending of the elastic member by relieving unevenness of the stress between the first region 1A and the second region 2A by the second pattern portion PA2 formed in the second region 2A.

The second pattern portion PA2 may be formed in a shape the same as or similar to that of the first pattern portion PA1. In detail, the second pattern portion PA2 may be formed in a shape having a longitudinal direction and a transverse direction, a longitudinal direction of the second pattern portion PA1 and a longitudinal direction of the first pattern portion PA1 may extend the same or similar directions to each other, and a transverse direction of the second pattern portion PA2 and a transverse direction of the first pattern portion PA1 may extend in the same or similar directions to each other.

Hereinafter, a layer structure of the elastic member described above will be described with reference to FIGS. 21 to 23.

FIGS. 21 to 23 are cross-sectional views for describing a layer structure of the elastic member 1000.

Referring to FIG. 21, the elastic member 1000 may include a first layer 100, a second layer 200, and a third layer 300. In detail, the elastic member 1000 may include the first layer 100, the second layer 200 on the first layer 100, and the third layer 300 between the first layer 100 and the second layer 200.

The first layer 100 may include a metal. In detail, the first layer 100 may include a metal or a metal alloy. For example, the first layer 100 may include SUS or copper (Cu). Alternatively, the first layer 100 may be formed of an alloy including at least one of nickel (Ni), chromium (Cr), iron (Fe), titanium (Ti), manganese (Mn), molybdenum (Mo), silver (Ag), zinc (Zn), nitrogen (N), and aluminum (Al) together with copper (Cu).

The second layer 200 may be disposed on the first layer 100.

The second layer 200 may be disposed on the first layer 100 to serve to planarize a surface of the first layer 100. As described above, a plurality of pattern portions in a hole or groove shape may be formed in the first layer 100 and the surface of the first layer 100 may not be flat due to the pattern portions. Accordingly, when a panel or the like is directly adhered to the first layer 100, the adhesion to the panel may be deteriorated due to surface characteristics of the first layer 100.

Accordingly, the elastic member 1000 may dispose the second layer 200 on the first layer 100 to flatten an adhesive surface on which the elastic member 1000 is adhered to the panel. That is, the second layer 100 may be defined as a planarization layer of the elastic member 1000.

The second layer 200 may include a metal or a non-metal. In detail, the second layer 200 may include a metal or plastic. The second layer 200 may include different materials according to characteristics to be implemented in folding characteristics and strength among characteristics of the elastic member 1000.

For example, the second layer 200 may include plastic. For example, the second layer 200 may include polyimide (PI), but the embodiment is not limited thereto.

The third layer 300 may be disposed between the first layer 100 and the second layer 200. The third layer 300 may be disposed between the first layer 100 and the second layer 200 to adhere the first layer 100 and the second layer 200. That is, the third layer 300 may serve as an adhesive layer in the elastic member 1000.

Referring to FIGS. 22 and 23, the first layer 100 may be formed in multiple layers.

Referring to FIG. 22, the first layer 100 may include a 1-1 layer 110 and a 1-2 layer 120 on the 1-1 layer 110.

The 1-1 layer 110 and the 1-2 layer 120 may include a metal material. In detail, the 1-1 layer 110 and the 1-2 layer 120 may include different metal materials.

For example, the 1-1 layer 110 and the 1-2 layer 120 may include materials having different thermal conductivity. In detail, the 1-1 layer 110 may include a material having thermal conductivity higher than that of the 1-2 layer 120.

In addition, the 1-1 layer 110 and the 1-2 layer 120 may include materials having different yield strengths. In detail, the 1-2 layer 120 may include a material having a yield strength higher than that of the 1-1 layer 110.

For example, the 1-1 layer 110 may include copper or a copper alloy, and the 1-2 layer 120 may include SUS, but the embodiment is not limited thereto, and the 1-1 layer 110 and the 1-2 layer 120 may include various materials satisfying the thermal conductivity and the yield strength.

In addition, the 1-1 layer 110 and the 1-2 layer 120 may be disposed in direct contact with each other. In detail, the 1-1 layer 110 and the 1-2 layer 120 may be manufactured in a clad method.

Clad bonding is a method of bonding the 1-1 layer 110 and the 1-2 layer 120 by a method such as welding, rolling, casting, or extrusion without bonding using an adhesive, and it is possible to show better bonding force over time by destroying a mutual organization of each layer and stabilizing the bonding of each layer through interstitial penetration.

For example, the bonding may be formed by inducing atomic diffusion between dissimilar materials at a layer interface of different layers through rolling. Since the clad bonding may process curved surfaces unlike bonding using an adhesive and uses atomic diffusion bonding rather than bonding using the adhesive, it has an advantage of being able to maintain a bonded state for a long time.

The 1-1 layer 110 and the 1-2 layer 120 may be disposed to have the same or different thicknesses. For example, when it is desired to improve heat dissipation characteristics of the elastic member 1000, a thickness of the 1-1 layer 110 may be disposed to be greater than a thickness of the 1-2 layer 120. Alternatively, in order to improve folding properties of the elastic member 1000, the thickness of the 1-2 layer 120 may be greater than the thickness of the 1-1 layer 110.

That is, the thickness of the 1-1 layer 110 and the thickness of the 1-2 layer 120 may vary according to characteristics to be implemented in the elastic member 1000.

Referring to FIG. 23, the first layer 100 may include a 1-1 layer 110, a 1-2 layer 120 on the 1-1 layer 110, and a 1-3 layer 130 on the 1-2 layer 120.

The 1-1 layer 110, the 1-2 layer 120, and the 1-3 layer 130 may include a metal material. In detail, the 1-1 layer 110, the 1-2 layer 120, and the 1-3 layer 130 may include the same or different metal materials.

For example, the 1-1 layer 110 and the 1-3 layer 130 may include the same material from each other, and the 1-2 layer 120 may include a material different from those of the 1-1 layer 110 and the 1-3 layer 130.

The 1-1 layer 110, the 1-3 layer 130, and the 1-2 layer 120 may include materials having different thermal conductivity. In detail, the 1-1 layer 110 and the 1-3 layer 130 may include a material having thermal conductivity higher than that of the first 1-2 layer 120.

In addition, the 1-1 layer 110, the 1-3 layer 130, and the 1-2 layer 120 may include materials having different yield strengths. In detail, the first 1-2 layer 120 may include a material having a yield strength higher than those of the 1-1 layer 110 and the 1-3 layer 130.

For example, the 1-1 layer 110 and the 1-3 layer 130 may include copper or a copper alloy, and the first 1-2 layer 120 may include SUS, but the embodiment is not limited thereto, and the 1-1 layer 110, the 1-2 layer 120, and the 1-3 layer 130 may include various materials satisfying the thermal conductivity and the yield strength.

In addition, the 1-1 layer 110, the 1-2 layer 120, and the 1-3 layer 130 may be disposed in direct contact with each other. In detail, the 1-1 layer 110, the 1-2 layer 120, and the 1-3 layer 130 may be manufactured by the clad method described above.

The 1-1 layer 110, the 1-2 layer 120, and the 1-3 layer 130 may be disposed to have the same or different thicknesses from each other. For example, when it is desired to improve the heat dissipation characteristics of the elastic member 1000, the thickness of the 1-1 layer 110 and the thickness of the 1-3 layer 130 may be disposed to be greater than the thickness of the 1-2 layer 120. Alternatively, when it is desired to improve the folding properties of the elastic member 1000, the thickness of the 1-2 layer 120 may be disposed to be greater than those of the 1-1 layer 110 and the 1-3 layer 130.

That is, the thickness of the 1-1 layer 110, the thickness of the first 1-2 layer 120, and the thickness of the 1-3 layer 130 may vary depending on the properties to be implemented in the elastic member 1000.

Consequently, the first layer of the elastic member may include at least one of the 1-1 layer, the 1-2 layer, and the 1-3 layer.

FIGS. 24 and 25 are views for describing arrangement relationship of the third layer 300.

Referring to FIG. 24, the third layer 300 may be disposed on an upper surface of the first layer 100. In detail, after disposing the third layer 300 on the first layer 100 and disposing the second layer 200 on the third layer 300, the first layer 100 and the second layer 200 may be adhered through the third layer 300 by applying pressure on the upper surface.

In this case, the third layer 300 is not disposed inside the first pattern portion PA1 and the second pattern portion PA2 formed on the first layer 100, but the third layer 300 may be disposed only on the upper surface of the first layer 100.

Since the third layer is not disposed inside pattern portions of the first layer, when the elastic member is applied to the display device, refraction and total reflection of light according to the third layer may be minimized, so that light transmittance may be improved.

Alternatively, referring to FIG. 25, the third layer 300 may be disposed on the upper surface of the first layer 100. In detail, the third layer 300 may be disposed inside the first pattern portion PA1 and the second pattern portion PA2 of the first layer 100. In detail, the third layer 300 may be disposed while filling the inside of the first pattern portion PA1 and the second pattern portion PA2 in whole as shown in FIG. 25 or may be disposed while filling the inside of the first pattern portion PA1 and the second pattern portion PA2 in part.

In detail, after disposing the third layer 300 on the first layer 100 and disposing the second layer 200 on the third layer 300, the third layer 300 may adhere the first layer 100 and the second layer 200 while applying pressure onto the second layer 200 and filling both the inside of the first pattern portion PA1 and the second pattern portion PA2 in whole or in part.

Since the third layer is disposed inside the pattern portions of the first layer, when bonding the first layer and the second layer through the third layer, it is possible to improve the adhesive properties by making an area to which the pressure is applied uniform in a first region and a second region of the first layer.

In addition, it is possible to prevent impurities from penetrating through the pattern portions of the first layer.

Hereinafter, a folding support including the elastic member according to the embodiment described above will be described with reference to FIGS. 26 and 27.

Referring to FIGS. 26 and 27, the folding support may include the elastic member and a protective layer 400. FIG. 26 is a view illustrating a folding support in which the third layer is not disposed inside the pattern portion of the first layer, and FIG. 27 is a view illustrating a folding support in which the third layer formed of a plurality of layers is disposed inside the pattern portion of the first layer.

The folding support may include the above-described elastic member 1000 and the protective layer 400 disposed under the elastic member 10. In detail, the protective layer 400 may be disposed under the first layer 100 or the 1-1 layer 110 of the elastic member 1000.

Although not shown in the drawings, an adhesive layer is disposed between the protective layer 400 and the first layer 100 or between the protective layer 400 and the 1-1 layer 110, and the elastic member 1000 and the protective layer 400 may be adhered through the adhesive layer.

The protective layer 400 may have a color. For example, the protective layer 400 may be formed in a black-based color.

The protective layer 400 may include metal particles. For example, the protective layer 400 may include copper particles. Accordingly, heat generated in the display device may be dissipated through the protective layer 400 by improving a thermal conductivity of the protective layer 400.

The protective layer 400 may be disposed on one region of the elastic member 1000. In detail, the protective layer 400 may be disposed in a region corresponding to the first region 1A of the elastic member 1000. Alternatively, the protective layer 400 may be disposed in a region corresponding to the first region 1A and the second region 2A of the elastic member 1000.

For example, the protective layer 400 may be disposed in a region corresponding to the first region 1A and the second region 2A of the elastic member 1000 and may be disposed in an area smaller than the sum of areas of the first region 1A and the second region 2A. In detail, the protective layer 400 may be disposed in an area of 80% to 90% of the sum of the areas of the first region 1A and the second region 2A of the elastic member.

In addition, a thickness of the protective layer 400 may be smaller than the overall thickness of the elastic member 1000. That is, the thickness of the protective layer 400 may be smaller than the sum of thicknesses of the first layer, the second layer, and the third layer of the elastic member 400.

Hereinafter, a display device including the folding support according to the embodiment described above will be described with reference to FIGS. 28 and 29.

Referring to FIGS. 28 and 29, the display device 10 may include the folding support and the panel. FIG. 28 is a view illustrating a display device in which the third layer of the elastic member is not disposed inside the pattern portion of the first layer, and FIG. 29 is a view illustrating a display device in which the third layer formed of a plurality of layers is disposed inside the pattern portion of the first layer.

The display device 10 may include the folding support and a panel layer 600 that is disposed on the folding support and includes a display panel and/or a touch panel.

The folding support may include the elastic member 1000 including the first layer 100, the second layer 200, and the third layer 300 described above and the protective layer 400 disposed under the elastic member 1000. In detail, the protective layer 400 may be disposed under the first layer 100 or the 1-1 layer 110 of the elastic member 1000.

An adhesive layer 500 may be disposed between the elastic member 1000 and the panel layer 600, and the elastic member 1000 may be adhered to the panel layer 600 through the adhesive layer 500.

As described above, since the elastic member 1000 may planarize an adhesive surface of the elastic member by the second layer 200, the elastic member and the panel layer may be stably adhered to each other without being affected by a step difference.

The adhesive layer 500 between the elastic member 1000 and the panel layer 600 may have different properties from the third layer 300 of the elastic member 1000.

In detail, the adhesive layer 500 may have a thickness smaller than that of the third layer 300. For example, the thickness of the adhesive layer 500 may be 5 μm to 15 μm.

In addition, the adhesive layer 500 may have smaller adhesive properties than the third layer 300. In detail, an adhesive force of the adhesive layer 500 may be 400 or less.

In addition, the adhesive layer 500 and the third layer 300 may have different elastic moduli. That is, the adhesive layer 500 does not have an elastic modulus having a storage modulus, creep & recovery and a tangent delta value like the third layer, whereby the adhesive layer 500 may not have elastic properties other than adhesive properties.

FIG. 30 is a view for describing an example in which the elastic member according to the embodiments is applied.

Referring to FIG. 30, the elastic member according to the embodiments may be applied to a flexible or foldable display device for displaying a display.

For example, the elastic member according to the embodiments may be applied to a flexible display device such as a mobile phone or a tablet.

Such an elastic member may be applied to a flexible display device such as a mobile phone or a tablet that is flexible, bent, or folded.

The elastic member is applied to the flexible display device such as the mobile phone or the tablet that is flexible, bent or folded and improves the folding reliability in a display device that is repeatedly folded or folded, thereby improving the reliability of the flexible display device.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present disclosure.

In addition, embodiments are mostly described above, but the embodiments are merely examples and do not limit the present disclosure, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present disclosure defined in the following claims.

What is claimed is:

1. An elastic member foldable based on a folding axis:

wherein the elastic member is defined in a first direction corresponding to the folding axis and a second direction perpendicular to the first direction;

wherein the elastic member includes a pattern portion including a plurality of patterns wherein the pattern portion includes:

a first pattern portion located closest to the folding axis and including a plurality of first patterns spaced apart from each other along the first direction;

a second pattern portion located farther from the folding axis than the first pattern portion and including a plurality of second patterns spaced apart from each other along the first direction; and a third pattern portion located farther from the folding axis than the first and second pattern portions and including a plurality of third patterns spaced apart from each other along the first direction;

wherein a length of the first pattern in the first direction is greater than each of lengths of the second pattern and the third pattern in the first direction, wherein the length of the second pattern in the first direction is greater than the length of the third pattern in the first direction, wherein the elastic member includes a first side surface and a second side surface located in the first direction, wherein the first pattern includes a first outer pattern closest to the first side surface, wherein the second pattern includes a second outer pattern closest to the first side surface, wherein the third pattern includes a third outer pattern closest to the first side surface, wherein a distance from the first side surface to the first outer pattern in the first direction is smaller than a distance from the first side surface to the second outer pattern and the third outer pattern in the first direction, and wherein a distance from the first side surface to the second outer pattern in the first direction is smaller than a distance from the first side surface to the third outer pattern in the first direction.

2. The elastic member of claim 1, wherein a width of the first pattern in the second direction is equal to at least one of a width of the second pattern in the second direction and a width of the third pattern in the second direction.

3. The elastic member of claim 1, wherein a distance between the first pattern and the second pattern in the second direction is the same as a distance between the second pattern and the third pattern in the second direction.

4. The elastic member of claim 3, wherein a hinge portion is spaced apart from the first outer pattern in the first direction and is connected to the first side surface.

5. The elastic member of claim 4, wherein a length of the hinge portion in the first direction is greater than or equal to the length of the second pattern and the third pattern in the first direction.

6. The elastic member of claim 5, wherein the length of the third pattern in the first direction is smaller than the length of the hinge portion in the first direction.

7. The elastic member of claim 3,
wherein the first pattern portion includes:
a 1-1 pattern portion and a 1-2 pattern portion arranged to face each other in the second direction with the folding axis in therebetween, and
wherein the 1-1 pattern portion includes a plurality of 1-1 patterns arranged and spaced apart from each other along the first direction,
wherein the 1-2 pattern portion includes a plurality of 1-2 patterns spaced apart from each other along the first direction,
wherein a length of the 1-1 pattern in the first direction and a length of the 1-2 pattern in the first direction are greater than the length of the length of the second pattern in the first direction and the length of the third pattern in the first direction.

8. The elastic member of claim 7, wherein a distance between the 1-1 pattern and the 1-2 pattern in the second direction is the same as the distance between the second pattern and the third pattern in the second direction.

9. An elastic member foldable based on a folding axis:
wherein the elastic member is defined in a first direction corresponding to the folding axis and a second direction perpendicular to the first direction,
wherein the elastic member includes a pattern portion including a plurality of patterns,
wherein the pattern portion includes:
a first pattern portion located closest to the folding axis and including a plurality of first patterns spaced apart from each other along the first direction;
a second pattern portion located farther from the folding axis than the first pattern portion and including a plurality of second patterns spaced apart from each other along the first direction; and
a third pattern portion located farther from the folding axis than the first and second pattern portions and including a plurality of third patterns spaced apart from each other along the first direction;
wherein sizes of the first pattern, the second pattern, and the third pattern are different from each other,
wherein a distance between the first pattern and the second pattern in the second direction is the same as the distance between the second pattern and the third pattern in the second direction,
wherein the elastic member includes a first side surface and a second side surface located in the first direction,
wherein each of the first to third pattern portions includes an outermost pattern that is spaced apart from the first side surface along the first direction and is closest to the first side surface, and
wherein a distance in the first direction from the first side surface to the outermost pattern of each of the first to third pattern parts is greater for a pattern portion having a greater distance from the folding axis.

10. The elastic member of claim 9,
wherein a length of the first pattern in the first direction is greater than each of lengths of the second pattern and the third pattern in the first direction, and
wherein the length of the second pattern in the first direction is greater than the length of the third pattern in the first direction.

11. The elastic member of claim 10,
wherein the first pattern portion includes:
a 1-1 pattern portion and a 1-2 pattern portion arranged to face each other in the second direction with the folding axis in therebetween, and
wherein the 1-1 pattern portion includes a plurality of 1-1 patterns arranged and spaced apart from each other along the first direction,
wherein the 1-2 pattern portion includes a plurality of 1-2 patterns spaced apart from each other along the first direction,
wherein a length of the 1-1 pattern in the first direction and a length of the 1-2 pattern in the first direction are greater than the length of the length of the second pattern in the first direction and the length of the third pattern in the first direction.

12. The elastic member of claim 11, wherein a distance between the 1-1 pattern and the 1-2 pattern in the second direction is the same as the distance between the second pattern and the third pattern in the second direction.

13. The elastic member of claim 9, wherein a width of the first pattern in the second direction is equal to at least one of the width of the second pattern in the second direction and the width of the third pattern in the second direction.

14. The elastic member of claim 9, wherein a hinge portion is spaced apart from the outermost pattern of the first pattern portion in the first direction and is connected to the first side surface.

15. The elastic member of claim 14, wherein a length of the hinge portion in the first direction is greater than or equal to the length of the second pattern and the third pattern in the first direction.

16. The elastic member of claim 15, wherein the length of the third pattern in the first direction is smaller than the length of the hinge portion in the first direction.

17. The elastic member of claim 14,
wherein a distance from the first side surface to the outermost pattern of the first pattern portion in the first direction is smaller than a distance from the first side surface to the outermost pattern of each of the second pattern portion and the third pattern portion, and
wherein a distance from the first side surface to the outermost pattern of the second pattern portion in the first direction is smaller than a distance from the first side surface to the outermost pattern of the third pattern portion in the first direction.

18. An elastic member foldable based on a folding axis:
wherein the elastic member is defined in a first direction corresponding to the folding axis and a second direction perpendicular to the first direction;
wherein the elastic member includes a pattern portion including a plurality of patterns;
wherein the pattern portion includes:
a first pattern portion located closest to the folding axis and including a plurality of first patterns spaced apart from each other along the first direction;

a second pattern portion located farther from the folding axis than the first pattern portion and including a plurality of second patterns spaced apart from each other along the first direction; and a third pattern portion located farther from the folding axis than the first and second pattern portions and including a plurality of third patterns spaced apart from each other along the first direction, wherein a length of the first pattern in the first direction is greater than each of lengths of the second pattern and the third pattern in the first direction, wherein the length of the second pattern in the first direction is greater than the length of the third pattern in the first direction, wherein a width of the first pattern in the second direction is equal to the width of the second pattern in the second direction and the width of the third pattern in the second direction, wherein a distance between the first pattern and the second pattern in the second direction is the same as the distance between the second pattern and the third pattern in the second direction, wherein the elastic member includes a first side surface and a second side surface located in the first direction, wherein each of the first to third pattern portions includes an outermost pattern that is spaced apart from the first side surface along the first direction and is closest to the first side surface, and wherein a distance in the first direction from the first side surface to the outermost pattern of each of the first to third pattern parts is greater for a pattern portion having a greater distance from the folding axis.

* * * * *